United States Patent
Carnevali

(10) Patent No.: US 12,487,636 B2
(45) Date of Patent: Dec. 2, 2025

(54) DOCKING ADAPTER WITH A DOCKING BUTTON FOR MOBILE DEVICES AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

(*) Notice: Subject to any disclaimer, the term of this patent is extended or adjusted under 35 U.S.C. 154(b) by 160 days.

(21) Appl. No.: 18/612,977

(22) Filed: Mar. 21, 2024

(65) Prior Publication Data

US 2025/0298438 A1    Sep. 25, 2025

(51) Int. Cl.
*G06F 1/16* (2006.01)

(52) U.S. Cl.
CPC ................... *G06F 1/1632* (2013.01)

(58) Field of Classification Search
CPC ..... G06F 1/1628; G06F 1/1629; G06F 1/1632
See application file for complete search history.

(56) References Cited

U.S. PATENT DOCUMENTS

| | | |
|---|---|---|
| 809,977 A | 1/1906 | O'Brien |
| 1,786,459 A | 12/1930 | Simons |
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |

(Continued)

FOREIGN PATENT DOCUMENTS

| | | |
|---|---|---|
| CN | 1312603 | 9/2001 |
| CN | 101674096 | 3/2010 |

(Continued)

OTHER PUBLICATIONS

MC40 Integrator Guide, Motorola Solutions, Inc., Oct. 4, 2013.

(Continued)

*Primary Examiner* — Adrian S Wilson
(74) *Attorney, Agent, or Firm* — Branch Partners PLLC; Bruce E. Black

(57) ABSTRACT

A docking adapter for a mobile device includes an adapter body having a back plate and a connector body coupled to the back plate, wherein, when coupled to the mobile device, the docking adapter only engages a back surface and a single side surface of the mobile device or the case; a connector adapter at least partially disposed in the connector body, the connector adapter including a male plug configured for insertion into a female connector of the mobile device, the male plug including first contacts configured for electrically coupling to the mobile device; second contacts electrically coupled to the first contacts and configured for electrically coupling to a dock or other external device; and either a) a docking button permanently coupled to the back plate of the adapter body or b) a docking button indentation defined in, or attached to, the back plate of the adapter body.

20 Claims, 15 Drawing Sheets

(56) References Cited

U.S. PATENT DOCUMENTS

| | | |
|---|---|---|
| 3,464,579 A | 9/1969 | Asenbauer |
| 3,667,648 A | 6/1972 | Koziol |
| 3,808,577 A | 4/1974 | Mathauser |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 8/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,052,943 A | 10/1991 | Davis |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,388,692 A | 2/1995 | Withrow et al. |
| 5,457,745 A | 10/1995 | Wang |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,708,707 A | 1/1998 | Halttunen et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,888,087 A | 3/1999 | Hanson et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,191,943 B1 | 2/2001 | Tracy |
| D439,218 S | 3/2001 | Yu |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,317,313 B1 | 11/2001 | Mosgrove et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,392,882 B1 | 5/2002 | Chen et al. |
| 6,406,758 B1 | 6/2002 | Bottari et al. |
| 6,407,860 B1 | 6/2002 | Funazaki et al. |
| 6,438,229 B1 | 8/2002 | Overy et al. |
| 6,561,476 B2 | 5/2003 | Carnevali |
| 6,565,363 B2 | 5/2003 | Downing |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,714,802 B1 | 3/2004 | Barvesten |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,054,042 B2 | 5/2006 | Holmes et al. |
| 7,068,783 B2 | 6/2006 | Peiker |
| 7,158,376 B2 | 1/2007 | Richardson et al. |
| 7,180,735 B2 | 2/2007 | Thomas et al. |
| 7,203,058 B2 | 4/2007 | Hong |
| 7,230,823 B2 | 6/2007 | Richardson et al. |
| 7,236,356 B2 | 6/2007 | Ulla et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,320,450 B2 | 1/2008 | Carnevali |
| 7,329,128 B1 | 2/2008 | Awad |
| 7,351,066 B2 | 4/2008 | DiFonzo et al. |
| 7,430,674 B2 | 9/2008 | von Mueller et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,573,706 B2 | 8/2009 | Carnevali |
| 7,594,576 B2 | 9/2009 | Chen et al. |
| 7,609,512 B2 | 10/2009 | Richardson et al. |
| 7,612,997 B1 | 11/2009 | Diebel et al. |
| 7,625,212 B2 | 12/2009 | Du |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,775,801 B2 | 8/2010 | Shiff et al. |
| 7,782,610 B2 | 8/2010 | Diebel et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| RE42,060 E | 1/2011 | Carnevali |
| 7,889,489 B2 | 2/2011 | Richardson et al. |
| 7,889,498 B2 | 2/2011 | Diebel et al. |
| 7,894,180 B2 | 2/2011 | Carnevali |
| 7,901,216 B2 | 3/2011 | Rohrbach et al. |
| 7,907,394 B2 | 3/2011 | Richardson et al. |
| 7,911,779 B1 | 3/2011 | Tarnoff |
| 7,946,868 B1 | 5/2011 | Chen |
| 7,946,891 B2 | 5/2011 | Peiker |
| 7,970,440 B2 | 6/2011 | Bury |
| RE42,581 E | 8/2011 | Carnevali |
| 7,997,554 B2 | 8/2011 | Carnevali |
| 8,054,042 B2 | 11/2011 | Griffin, Jr. et al. |
| 8,061,516 B2 | 11/2011 | Carnevali |
| 8,062,078 B2 | 11/2011 | Asai et al. |
| 8,074,951 B2 | 12/2011 | Carnevali |
| 8,080,975 B2 | 12/2011 | Bessa et al. |
| 8,087,939 B2 | 1/2012 | Rohrbach et al. |
| 8,099,138 B2 | 1/2012 | Piekarz |
| 8,167,624 B2 | 5/2012 | Hartlef et al. |
| 8,172,580 B1 | 5/2012 | Chen et al. |
| 8,177,178 B2 | 5/2012 | Carnevaali |
| 8,177,560 B2 | 5/2012 | Rohrbach et al. |
| 8,179,672 B2 | 5/2012 | Carnevali |
| 8,183,825 B2 | 5/2012 | Sa |
| 8,224,408 B2 | 7/2012 | Tomasini et al. |
| 8,295,043 B2 | 10/2012 | Tai et al. |
| RE43,806 E | 11/2012 | Carnevali |
| 8,367,235 B2 | 2/2013 | Huang |
| 8,390,255 B1 | 3/2013 | Fathollahi |

(56) References Cited

U.S. PATENT DOCUMENTS

| | | |
|---|---|---|
| 8,405,974 B2 | 3/2013 | Sayavong |
| 8,414,312 B2 | 4/2013 | Hung et al. |
| 8,430,240 B2 | 4/2013 | Kim |
| 8,435,042 B2 | 5/2013 | Rohrbach et al. |
| 8,453,835 B2 | 6/2013 | So |
| 8,454,178 B2 | 6/2013 | Carnevali |
| 8,457,701 B2 | 6/2013 | Diebel |
| 8,483,758 B2 | 7/2013 | Huang |
| 8,497,753 B2 | 7/2013 | DiFonzo et al. |
| 8,505,861 B2 | 8/2013 | Carnevali |
| 8,531,833 B2 | 9/2013 | Diebel et al. |
| 8,553,408 B2 | 10/2013 | Supran et al. |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,675,359 B2 | 3/2014 | Chen |
| 8,690,582 B2 | 4/2014 | Rohrbach et al. |
| 8,702,316 B2 | 4/2014 | DiFonzo et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1 | 9/2014 | Gudino |
| 8,833,716 B2 | 9/2014 | Funk et al. |
| 8,844,817 B2 | 9/2014 | Glanzer et al. |
| 8,873,233 B2 | 10/2014 | Reber et al. |
| D718,293 S | 11/2014 | Namminga |
| 8,891,800 B1 | 11/2014 | Shaffer |
| 8,894,420 B2 | 11/2014 | Schichl et al. |
| 8,907,783 B2 | 12/2014 | Fish et al. |
| 8,911,246 B2 | 12/2014 | Carnevali |
| 8,917,506 B2 | 12/2014 | Diebel et al. |
| 8,929,065 B2 | 1/2015 | Williams |
| 8,950,717 B2 | 2/2015 | Chuang |
| 8,970,332 B2 | 3/2015 | DiFonzo et al. |
| 9,007,758 B2 | 4/2015 | Wilson et al. |
| 9,011,184 B2 | 4/2015 | Chen et al. |
| 9,019,698 B2 | 4/2015 | Thiers |
| 9,026,187 B2 | 5/2015 | Huang |
| 9,036,343 B2 | 5/2015 | Carnevali |
| 9,071,060 B2 | 6/2015 | Fathollahi |
| 9,072,172 B2 | 6/2015 | Hsu |
| 9,077,794 B2 | 7/2015 | Narendra et al. |
| 9,089,059 B1 | 7/2015 | Haskin et al. |
| 9,112,304 B2 | 8/2015 | Rohrbach et al. |
| 9,123,935 B2 | 9/2015 | Huang |
| 9,147,966 B2 | 9/2015 | An |
| 9,172,781 B1 | 10/2015 | Goldstein |
| 9,195,279 B2 | 11/2015 | Carnevali et al. |
| 9,201,593 B2 | 12/2015 | Collopy et al. |
| 9,229,494 B2 | 1/2016 | Rayner |
| 9,288,295 B2 | 3/2016 | Ivanovski et al. |
| 9,298,661 B2 | 3/2016 | Hamel et al. |
| 9,300,078 B2 | 3/2016 | Liu et al. |
| 9,300,081 B2 | 3/2016 | Rudisill et al. |
| 9,331,444 B2 | 5/2016 | Carnevali |
| 9,356,267 B1 | 5/2016 | To et al. |
| 9,495,375 B2 | 11/2016 | Huang et al. |
| 9,529,387 B2 | 12/2016 | Carnevali |
| 9,535,457 B1 | 1/2017 | Vier |
| 9,567,776 B2 | 2/2017 | Moock et al. |
| 9,591,113 B2 | 3/2017 | Filser et al. |
| 9,602,639 B2 | 3/2017 | Carnevali |
| 9,632,535 B2* | 4/2017 | Carnevali .......... H01R 13/6205 |
| 9,647,474 B2 | 5/2017 | Fathollahi et al. |
| 9,706,026 B2 | 7/2017 | Carnevali |
| 9,742,885 B2 | 8/2017 | Rostami |
| 9,748,535 B2 | 8/2017 | Huang et al. |
| 9,760,116 B2 | 9/2017 | Wylie |
| 9,762,013 B2 | 9/2017 | George et al. |
| 9,774,713 B2 | 9/2017 | Guerdrum et al. |
| 9,776,577 B2 | 10/2017 | Carnevali |
| 9,807,211 B2 | 10/2017 | Guerdrum et al. |
| 9,809,175 B2 | 11/2017 | Jonik et al. |
| 9,817,441 B1 | 11/2017 | Kuo |
| 9,831,904 B1 | 11/2017 | Carnevali |
| 9,898,041 B2 | 2/2018 | Blowers et al. |
| 9,924,005 B1 | 3/2018 | McElderry |
| 9,939,850 B2 | 4/2018 | Hoellwarth et al. |
| 10,033,204 B2 | 7/2018 | Huang et al. |
| 10,050,658 B2 | 8/2018 | Carnevali |
| 10,054,984 B2* | 8/2018 | Carnevali .......... H01R 13/6205 |
| 10,148,104 B2 | 12/2018 | Sa |
| 10,170,738 B2 | 1/2019 | Huang et al. |
| 10,172,246 B2 | 1/2019 | Apter |
| 10,277,266 B1* | 4/2019 | Nguyen ................ H02J 7/0013 |
| 10,330,251 B2 | 6/2019 | Carnevali |
| 10,389,399 B2 | 8/2019 | Carnevali |
| 10,401,905 B2 | 9/2019 | Carnevali |
| 10,416,715 B1 | 9/2019 | Wade et al. |
| 10,454,515 B2 | 10/2019 | Carnevali |
| 10,485,312 B2 | 11/2019 | Rodriguez |
| 10,516,431 B2 | 12/2019 | DiLella |
| 10,548,380 B2 | 2/2020 | Rayner et al. |
| 10,559,788 B2 | 2/2020 | Huang et al. |
| 10,571,964 B2* | 2/2020 | Barnett ................ G06F 1/1635 |
| 10,630,334 B2 | 4/2020 | Carnevali |
| 10,656,687 B2 | 5/2020 | Tashiro et al. |
| 10,666,309 B2 | 5/2020 | Carnevali |
| 10,707,632 B1 | 7/2020 | Yamamoto et al. |
| 10,714,953 B1 | 7/2020 | Solana et al. |
| 10,778,275 B2 | 9/2020 | Carnevali |
| 10,788,857 B2 | 9/2020 | Huang et al. |
| 10,812,643 B1 | 10/2020 | Carnevali et al. |
| D903,685 S | 12/2020 | Wright et al. |
| 10,928,856 B1 | 2/2021 | Hamlin et al. |
| D915,373 S | 4/2021 | Zhou |
| 10,976,777 B2 | 4/2021 | Pischel |
| 11,029,731 B1 | 6/2021 | Carnevali |
| D924,863 S | 7/2021 | Wright et al. |
| 11,076,032 B1 | 7/2021 | Carnevali |
| 11,165,458 B2 | 11/2021 | Carnevali |
| 11,277,506 B2 | 3/2022 | Carnevali |
| 11,289,864 B2 | 3/2022 | Carnevali et al. |
| 11,489,350 B2 | 11/2022 | Carnevali |
| 11,522,379 B2 | 12/2022 | Lee et al. |
| 11,597,334 B2 | 3/2023 | Telesco et al. |
| 11,619,971 B1 | 4/2023 | Passe et al. |
| 11,622,032 B2 | 4/2023 | Wright et al. |
| 11,652,326 B2 | 5/2023 | Carnevali |
| 12,132,511 B2* | 10/2024 | Carnevali ............. G06F 1/1632 |
| D1,052,884 S | 12/2024 | Hong |
| 2002/0009194 A1 | 1/2002 | Wong et al. |
| 2002/0032041 A1 | 3/2002 | Hirai et al. |
| 2002/0136557 A1 | 9/2002 | Shimamura |
| 2002/0191782 A1 | 12/2002 | Beger et al. |
| 2002/0193136 A1 | 12/2002 | Halkosaari et al. |
| 2003/0068986 A1 | 4/2003 | Oh |
| 2003/0116631 A1 | 6/2003 | Salvato et al. |
| 2003/0218445 A1 | 11/2003 | Behar |
| 2004/0108348 A1 | 6/2004 | Barnes |
| 2004/0209489 A1 | 10/2004 | Clapper |
| 2005/0189354 A1 | 9/2005 | Heather et al. |
| 2006/0058073 A1 | 3/2006 | Kim |
| 2006/0175766 A1 | 8/2006 | Carnevali |
| 2007/0127204 A1 | 6/2007 | Muenzer et al. |
| 2007/0261978 A1 | 11/2007 | Sanderson |
| 2008/0053770 A1 | 3/2008 | Tynyk |
| 2008/0104301 A1 | 5/2008 | Assouad et al. |
| 2008/0149796 A1 | 6/2008 | Moscovitch |
| 2008/0273734 A1 | 11/2008 | Solland |
| 2008/0320190 A1 | 12/2008 | Lydon et al. |
| 2009/0021903 A1 | 1/2009 | Chen et al. |
| 2009/0140113 A1 | 6/2009 | Carnevali |
| 2009/0160400 A1 | 6/2009 | Woud |
| 2009/0314400 A1 | 12/2009 | Liu |
| 2010/0013431 A1 | 1/2010 | Liu |
| 2010/0078343 A1* | 4/2010 | Hoellwarth ....... B29C 45/14639 206/320 |
| 2011/0122565 A1 | 5/2011 | Liu |
| 2011/0134601 A1 | 6/2011 | Sa |
| 2011/0159324 A1 | 6/2011 | Huang et al. |
| 2011/0287726 A1 | 11/2011 | Huang |

(56) References Cited

U.S. PATENT DOCUMENTS

| | | |
|---|---|---|
| 2011/0299238 A1 | 12/2011 | Radin et al. |
| 2012/0018325 A1 | 1/2012 | Kim |
| 2012/0043235 A1 | 2/2012 | Klement |
| 2012/0088558 A1 | 4/2012 | Song |
| 2012/0118773 A1 | 5/2012 | Rayner |
| 2012/0161706 A1 | 6/2012 | Zhou |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2012/0303520 A1 | 11/2012 | Huang |
| 2013/0002193 A1 | 1/2013 | Aldana et al. |
| 2013/0023313 A1 | 1/2013 | Kim |
| 2013/0088188 A1 | 4/2013 | Romanenko |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0222991 A1 | 8/2013 | McWilliams |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0300267 A1 | 11/2013 | Richardson et al. |
| 2013/0322568 A1 | 12/2013 | Pais et al. |
| 2013/0331156 A1 | 12/2013 | Lui |
| 2013/0334071 A1 | 12/2013 | Carnevali |
| 2014/0035511 A1 | 2/2014 | Ferber et al. |
| 2014/0036420 A1 | 2/2014 | Chen |
| 2014/0042285 A1 | 2/2014 | Carnevali |
| 2014/0055928 A1 | 2/2014 | Lee |
| 2014/0059264 A1 | 2/2014 | Sudak |
| 2014/0065948 A1 | 3/2014 | Huang |
| 2014/0066144 A1 | 3/2014 | Hong |
| 2014/0070774 A1 | 3/2014 | Terlizzi et al. |
| 2014/0099526 A1 | 4/2014 | Powell et al. |
| 2014/0168885 A1 | 6/2014 | Williams |
| 2014/0307376 A1 | 10/2014 | Lee |
| 2014/0347000 A1 | 11/2014 | Hamann et al. |
| 2014/0363988 A1 | 12/2014 | An |
| 2015/0011099 A1 | 1/2015 | Kim et al. |
| 2015/0055289 A1 | 2/2015 | Chang et al. |
| 2015/0098184 A1 | 4/2015 | Tsai et al. |
| 2015/0146401 A1 | 5/2015 | Su et al. |
| 2015/0189780 A1 | 7/2015 | Su et al. |
| 2015/0244126 A1* | 8/2015 | Carnevali ............ G06F 1/1628 |
| | | 439/527 |
| 2015/0270861 A1 | 9/2015 | Lin et al. |
| 2016/0065702 A1 | 3/2016 | Carnevali |
| 2016/0070300 A1* | 3/2016 | Carnevali ............ H01R 13/629 |
| | | 361/679.41 |
| 2016/0231779 A1 | 8/2016 | Kaneko et al. |
| 2016/0309010 A1 | 10/2016 | Carnevali |
| 2017/0035170 A1* | 2/2017 | Rayner ............ F16M 11/10 |
| 2017/0054312 A1 | 2/2017 | Kuchynka et al. |
| 2017/0227987 A1* | 8/2017 | Carnevali ............ G06F 1/1632 |
| 2018/0279809 A1 | 10/2018 | Regan et al. |
| 2018/0314296 A1 | 11/2018 | Evns, V et al. |
| 2019/0243419 A1 | 8/2019 | Charlesworth et al. |
| 2019/0267825 A1 | 8/2019 | Chien |
| 2020/0195763 A1 | 6/2020 | Ellis |
| 2020/0197563 A1 | 6/2020 | Shen et al. |
| 2020/0326955 A1 | 10/2020 | Adiletta et al. |
| 2020/0330037 A1 | 10/2020 | Al-Ali et al. |
| 2020/0371555 A1 | 11/2020 | Huang et al. |
| 2021/0048848 A1 | 2/2021 | Pischel |
| 2021/0194256 A1 | 6/2021 | Carnevali |
| 2021/0391678 A1* | 12/2021 | Carnevali ............ H04B 1/3888 |
| 2021/0392773 A1* | 12/2021 | Carnevali ............ H01R 13/516 |
| 2022/0026951 A1 | 1/2022 | Wood, III et al. |
| 2022/0066505 A1 | 3/2022 | Lu et al. |
| 2022/0253097 A1 | 8/2022 | Carnevali et al. |
| 2022/0352682 A1 | 11/2022 | Carnevali |
| 2023/0039167 A1 | 2/2023 | Kamepalli et al. |
| 2023/0045485 A1 | 2/2023 | Carnevali et al. |
| 2023/0341897 A1 | 10/2023 | Carnevali et al. |
| 2024/0399976 A1* | 12/2024 | Carnevali ............ B60R 11/0241 |
| 2024/0403251 A1 | 12/2024 | Anderson |
| 2025/0224768 A1 | 7/2025 | Carnevali |
| 2025/0226846 A1 | 7/2025 | Carnevali |
| 2025/0274541 A1* | 8/2025 | Carnevali ............ G06F 1/1629 |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| EP | 3734410 A1 | 11/2020 |
| JP | 2004-349969 | 12/2004 |
| JP | 2014-75327 | 4/2014 |
| KR | 20-0265673 | 2/2002 |
| KR | 10-1078214 | 11/2011 |
| KR | 101609754 B1 | 4/2016 |
| TW | 2003TW531119 | 5/2003 |
| TW | M422808 | 2/2012 |
| WO | 2012/052751 | 4/2012 |
| WO | 2013/081222 | 6/2013 |
| WO | WO 2014/010781 A1 | 1/2014 |
| WO | 2014/054426 | 4/2014 |
| WO | 2015/022675 | 2/2015 |

OTHER PUBLICATIONS

Various documents for iPort LaunchPort Product, alleged to have been available as early as 2013.
Juice Pack System Air Manual—Juice Pack System Air alleged to have been available as early as Feb. 6, 2013.
Juice Pack System Press Releases dated Jun. 14, 2011; Jun. 19, 2012; and Feb. 6, 2013.
Juice Pack System Dock Manual—Juice Pack System Dock alleged to have been available as early as Feb. 6, 2013.
Juice Pack System images—Juice Pack System alleged to have been available as early as Feb. 6, 2013.
Juice Pack System Helium Manual—Juice Pack System Helium alleged to have been available as early as Feb. 6, 2013.
Juice Pack System Add-Ons—Juice Pack System alleged to have been available as early as Feb. 6, 2013.
Juice Pack System Plus iPhone 6 Manual—Juice Pack System Plus alleged to have been available as early as Feb. 6, 2013.
Juice Pack System Dock Page IA—Juice Pack System Dock alleged to have been available as early as Feb. 6, 2013.
Wildcharge System reviews—Wildcharge System alleged to have been available as early as Mar. 23, 2008.
Wildcharge System articles dated Mar. 23, 2008; Jun. 23, 2009; and Sep. 2009.
Wildcharge System webpages—Wildcharge System alleged to have been available as early as Mar. 23, 2008 and these webpages alllegedly are from 2009 and 2010.
Wildcharge System Press Release from Nov. 13, 2007.
Wildcharge System WildCharge Wire Free Power alleged to have been available as early as Mar. 23, 2008.
Wildcharge System WildCharge Skin for iPhone alleged to have been available as early as Mar. 23, 2008.
Wildcharge System images—Wildcharge System alleged to have been available as early as Mar. 23, 2008.
International Search Report and Written Opinion for PCT Application for PCT/US2025/020259 mailed Jun. 2, 2025.
U.S. Appl. No. 18/404,795, filed Jan. 4, 2024.
U.S. Appl. No. 18/614,482, filed Mar. 22, 2024.
U.S. Appl. No. 18/218,381, filed Jul. 5, 2023.
U.S. Appl. No. 18/233,218, filed Aug. 11, 2023.
U.S. Appl. No. 18/638,430, filed Apr. 17, 2024.
Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(56) References Cited

OTHER PUBLICATIONS

Officeonthego.com, 3 pages of product description of Magnifico ®PLUS screen magnifier product information retrieved from web site at: www.officeonthego.com.
2 pages of product information for Armor 1600 and Armor 1601 waterproof, dustproof and airtight protective cases.
2 pages Otterox 4600 Tablet PC Case protective cases product information retrieved from web site at: www.otterbox.com.
Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].
Battery Charging Specification (Including errata and ECNs through Mar. 15, 2012); Revision 1.2, Mar. 15, 2012. 72 pages.
U.S. Appl. No. 18/590,837, filed Feb. 28, 2024.

\* cited by examiner

DOCKING ADAPTER WITH A DOCKING BUTTON FOR MOBILE DEVICES AND METHODS OF MAKING AND USING

FIELD

The present invention is directed to docking adapters for a mobile device. The present invention is also directed to docking adapters for a mobile device that include a docking button arrangement.

BACKGROUND

Mobile devices, such as smartphones, cellular or mobile phones, tablets, personal data assistants, and other portable devices, are now ubiquitous. Cradles can be used to protect the mobile device, to mount the mobile device onto a surface or object, or to provide power, or data to or from, the mobile device, or any combination thereof.

BRIEF SUMMARY

One embodiment is a docking adapter for a mobile device. The docking adapter includes an adapter body having a back plate and a connector body coupled to the back plate, the back plate configured for disposition against a portion of a back surface of the mobile device or of a case containing the mobile device, wherein, when coupled to the mobile device, the docking adapter only engages the back surface and a single side surface of the mobile device or the case containing the mobile device; a connector adapter at least partially disposed in the connector body, the connector adapter including a male plug configured for insertion into a female connector of the mobile device, the male plug including a plurality of first contacts configured for electrically coupling to the mobile device; a plurality of second contacts electrically coupled to the first contacts and configured for electrically coupling to a dock or other external device; and either a) a docking button permanently coupled to, and extending away from, the back plate of the adapter body or b) a docking button indentation defined in, or attached to, the back plate of the adapter body and configured to receive a docking button.

In at least some embodiments, the connector adapter further includes a contactor disposed opposite the male plug and exposed through an opening in the connector body, wherein the second contacts are disposed on the contactor. In at least some embodiments, the docking adapter further includes third contacts configured for engagement with contacts on a back surface of the mobile device or the case.

In at least some embodiments, at least a portion of the second contacts are disposed on the docking button or the docking button indentation. In at least some embodiments, the connector adapter further includes a contactor disposed opposite the male plug and exposed through an opening in the connector body, wherein another portion of the second contacts are disposed on the contactor.

In at least some embodiments, the docking button has a shape selected from triangular, square, rectangular, rhomboidal, trapezoidal, pentagonal, hexagonal, octagonal, or decagonal. In at least some embodiments, the docking adapter further includes a mounting neck disposed between the docking button and the adapter body. In at least some embodiments, the docking adapter further includes a strap coupled to the adapter body for receiving a hand of a user In at least some embodiments, the connector adapter further includes a female connector electrically coupled to the male plug. In at least some embodiments, the female connector is positioned to be adjacent a back surface of the mobile device or the case when the mobile device is coupled to the docking adapter.

In at least some embodiments, the adapter body includes a rim extending around a least a portion of the back plate. In at least some embodiments, the docking adapter further includes adhesive disposed on at least the back plate. In at least some embodiments, the adapter body and adhesive are configured to produce a water-resistant seal around the docking adapter when the docking adapter is adhesively attached to the mobile device or case.

Another embodiment is a docking adapter for a mobile device. The docking adapter includes an adapter body including a back plate and a connector body coupled to the back plate, the back plate configured for disposition against a portion of a back surface of the mobile device or of a case containing the mobile device; a connector adapter at least partially disposed in the connector body, the connector adapter including a male plug configured for insertion into a female connector of the mobile device and including a plurality of first contacts configured for electrically coupling to the mobile device and a plurality of second contacts electrically coupled to the first contacts and configured for electrically coupling to a dock or other external device; and either a) a docking button permanently coupled to, and extending away from, the back plate of the adapter body or b) a docking button indentation defined in, or attached to, the back plate of the adapter body and configured to receive a docking button. In at least some embodiments, the docking adapter further includes a plurality of docking button contacts disposed on the docking button or the docking button indentation and electrically coupled to the first contacts. Some embodiments can include any applicable features described above.

Yet another embodiment is a docking adapter for a mobile device. The docking adapter includes an adapter body including a back plate and a connector body coupled to the back plate, the back plate configured for disposition against a portion of a back surface of the mobile device or of a case containing the mobile device, wherein, when coupled to the mobile device, the docking adapter only engages the back surface and a single side surface of the mobile device or the case containing the mobile device; a connector adapter at least partially disposed in the connector body, the connector adapter including a male plug configured for insertion into a female connector of the mobile device and including a plurality of first contacts configured for electrically coupling to the mobile device; and either a) a docking button permanently coupled to, and extending away from, the back plate of the adapter body or b) a docking button indentation defined in, or attached to, the back plate of the adapter body and configured to receive a docking button, wherein the docking button or docking button indentation includes a plurality of second contacts electrically coupled to the first contacts and configured for electrically coupling to a dock or other external device. Some embodiments can include any applicable features described above.

A further embodiment is a system that includes any of the docking adapters described above and a dock configured for receiving the docking button of the docking adapter. In at least some embodiments, the system further includes the mobile device. In at least some embodiments, the system further includes a case configured to contain the mobile device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
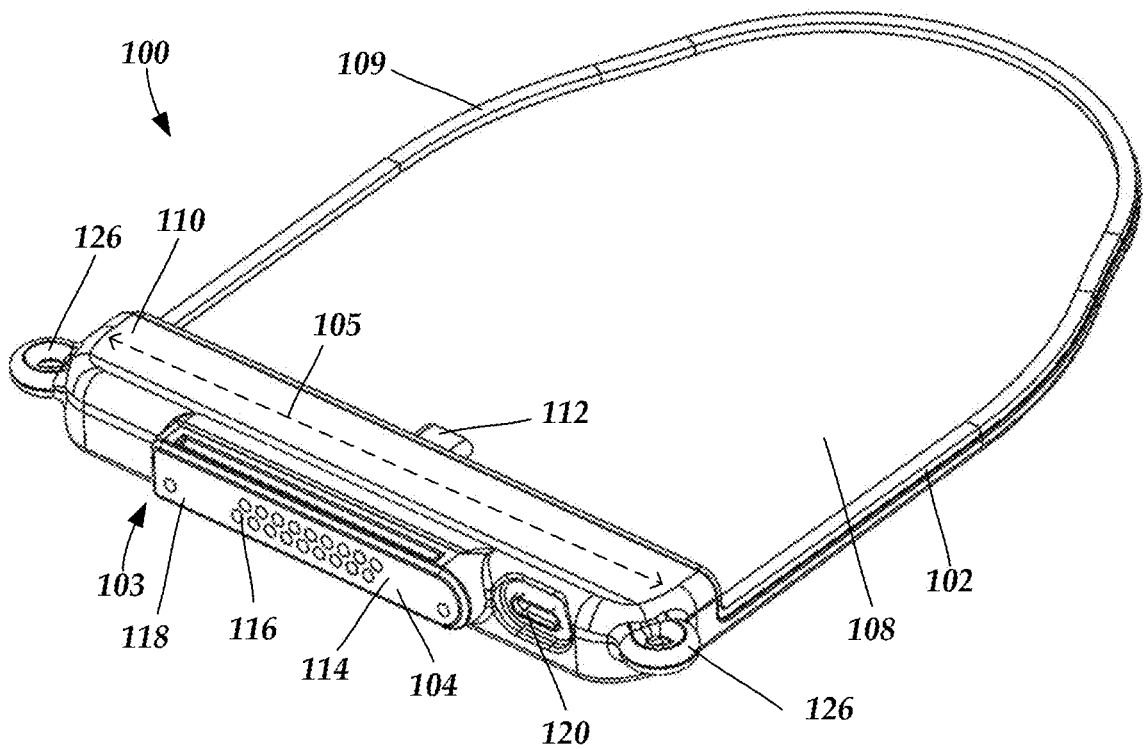
FIG. 1A is a schematic perspective front view of one embodiment of a docking adapter for a mobile device, according to the invention.

The present invention is directed to docking adapters for a mobile device. The present invention is also directed to docking adapters for a mobile device that include a docking button arrangement.

FIGS. 1A, 1B, 2A, and 2B illustrate one embodiment of a docking adapter 100 for a mobile device 150, such as a cellular or mobile phone, a smartphone, a tablet, a personal data assistant, or any other suitable mobile device. The docking adapter 100 includes an adapter body 102, an adapter connector 104 at least partially disposed in the adapter body, and a docking button 106 (FIG. 2A) extending away from the adapter body. In at least some embodiments, the mobile device 150 is contained in a case 152.

Figure 2A:
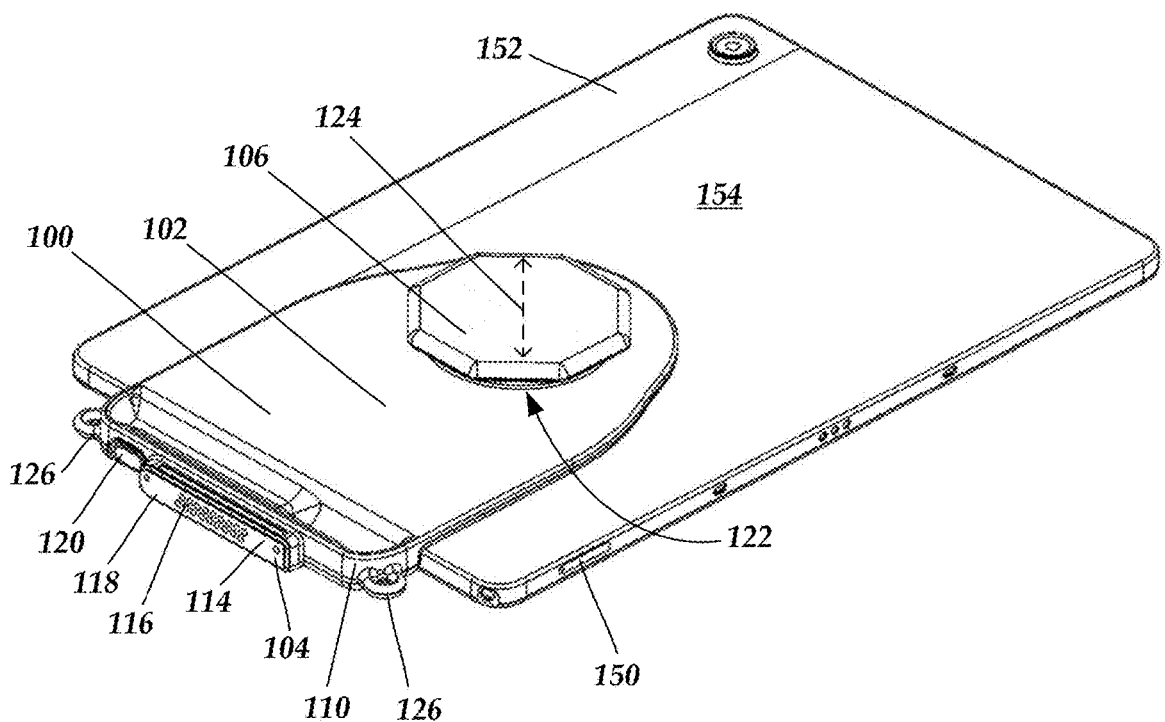
FIG. 2A is a schematic perspective back view of the docking adapter of FIG. 1A and a mobile device contained within a case, according to the invention.

The adapter body 102 includes a back plate 108 that is arranged for disposition against a portion of the back surface 154 of the mobile device 150 or the case 152 as illustrated in FIG. 2A. The docking button 106 extends away from the back plate 108 of the adapter body 102. In at least some embodiments, the docking button 106 is permanently coupled to the back plate 108 of the adapter body 102. The back plate 108 can have any suitable shape. In at least some embodiments, the back plate 108 has a length that is less than the length of the mobile device or a width that is less than the width of the mobile device (or both the described length and width). In at least some embodiments, the back plate 108 is arranged to cover no more than 75%, 50%, 40%, 33%, 30%, 25%, or 20% of the back surface of the mobile device 150 or case 152 when the mobile device is received by the docking adapter 100.

The adapter body 102 also includes a connector housing 110 which contains at least a portion of the adapter connector 104. In at least some embodiments, the connector housing 110 and back plate 108 are permanently attached to each other or formed (e.g., molded) as a single piece. In at least some embodiments, the connector housing 110 is configured for disposition against the bottom side surface 155 (FIGS. 2A and 2B) of the mobile device 150 or case 152 (e.g., the side of the mobile device with a connector for charging). In at least some embodiments, the adapter body 102 only engages the back surface and a single side surface (e.g., the bottom surface 155) of the mobile device 150 or case 152. In at least some embodiments, the portion of the connector housing 110 that engages the mobile device 150 or case 152 has a lateral length 105 that is less than a lateral length of the bottom surface of the mobile device or case. In at least some embodiments, the portion of the connector housing 110 that engages the mobile device 150 or case 152 has a lateral length 105 that is less than 80%, 75%, 67%, 50%, 40%, 33%, 25%, 20%, or 10% of the lateral length of the bottom surface of the mobile device or case. The connector housing 110 includes one or more openings 103 for exposure of one or more portions of the connector adapter 104.

In at least some embodiments, the connector housing 110 or other portion of the adapter body 102 includes one or more fastening elements, such as the eyelets 126 for attachment of the docking adapter 100 to a dock 160 (FIG. 4) using a fastener, such as screw, bolt, nail, or the like or for attaching a strap or the like, such as a hand, shoulder, or neck strap. Any other suitable fastening elements can be used and any number of fastening elements can be used.

In at least some embodiments, a rim 109 extends around at least a portion of the perimeter of the back plate 108 with the rim 109 elevated relative to (e.g., extending away from) a remainder of the back plate 108 for engagement of the mobile device 150 or the case 152. In the illustrated embodiment of FIGS. 1A and 1B, the rim 109 extends around the entire perimeter of the back plate 108 except where the back plate transitions, or is coupled, to the connector housing 110. In at least some embodiments, the rim 109 extends from the perimeter of the back plate 108 to a perimeter of a portion of the connector housing 110 that is intended to engage the mobile device 150 or the case 152 so that this portion of the rim 109 is elevated relative to (e.g., extending away from) an adjacent portion of the connector housing. In at least some embodiments, the rim 109 forms a closed perimeter (which may have any suitable shape), as illustrated in FIG. 1B, which, in at least some instances, engages the mobile device 150 or the case 152 as a closed perimeter.

The adapter body 102 can be made of any suitable material including any suitable polymeric material. The adapter body 102 can be made of a flexible material (for example, thermoplastic elastomeric polymer materials, other suitable flexible or elastomeric polymer materials, or the like or any combination thereof) or a rigid material or any combination thereof. In at least some embodiments, a material of the adapter body 102 (or a primary material of the adapter body) has a hardness in a range of 70 Shore A to 150. Rockwell R. Examples of suitable materials include, but are not limited to, polycarbonate (PC), acrylonitrile butadiene styrene (ABS), PC/ABS, nylon, thermoplastic urethane, thermoplastic elastomer, thermoplastic rubber, or the like or any combination thereof.

The adapter connector 104 includes a male plug 112 with first contacts 113 (FIGS. 3A and 3B) disposed thereon for electrically coupling to the mobile device 150 directly or via the case 152. The adapter connector 104 also includes a contactor 114 with second contacts 116 disposed thereon for electrically coupling to a dock 160 (FIG. 4) or other external device. The first contacts 113 (FIGS. 3A and 3B) are electrically coupled to the second contacts 116. The adapter connector 104 allows one or more of power or data to flow from (or to) the dock 160 or external device to (or from) the mobile device 150.

The male plug 112 can be any suitable type of male connector, depending on the mobile device 150 or case 152 to be used, including, but not limited to, any type of USB connector (for example, any type of USB-A, USB-B, USB-C, Micro-USB, or Mini-USB connector) or a Lightning connector. The adapter connector 104 optionally includes a female connector 120, such as a USB-A, USB-B, USB-C, Micro-USB, Mini-USB, or Lightning connector or the like. Contacts 121 (FIGS. 3A and 3B) of the female connector 120 are electrically coupled to the first contacts 113 of the male plug 112. In at least some embodiments, the docking adapter 100 may include a plug (not shown) for insertion in the female connector 120 when the female connector is not in use.

Figure 1B:
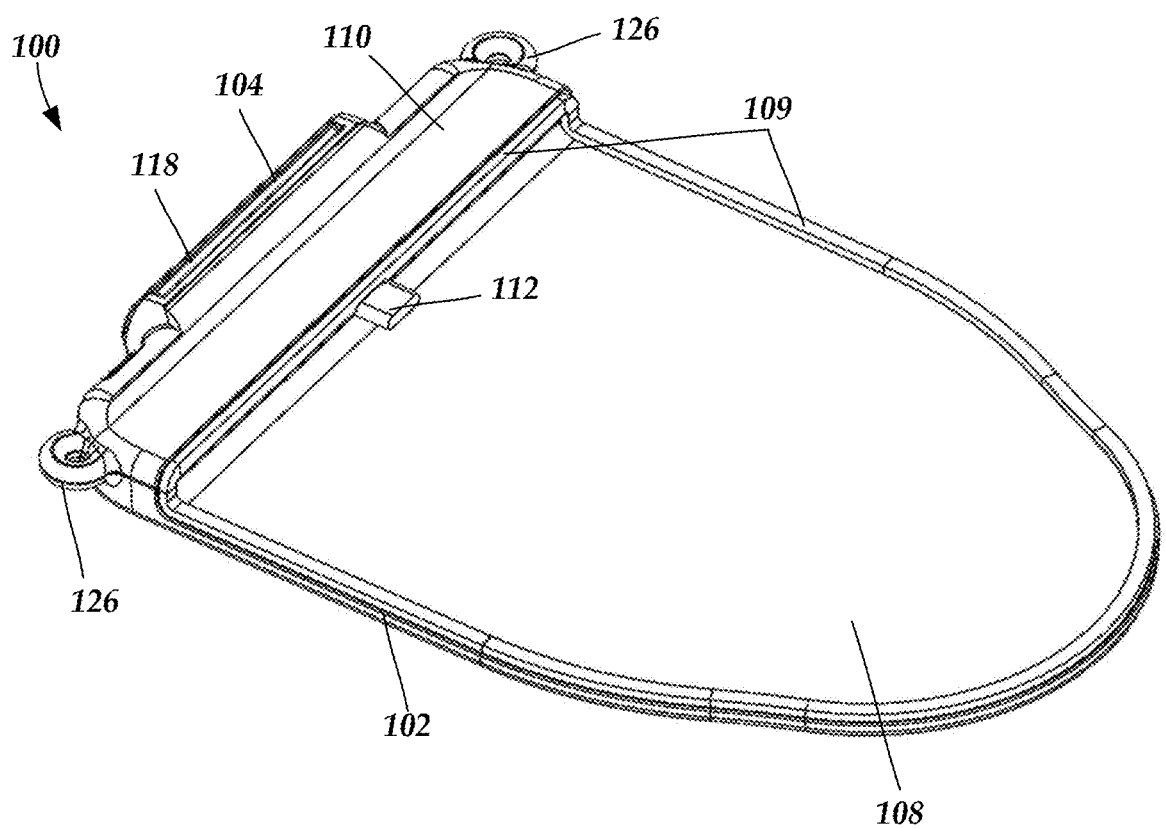
FIG. 1B is a schematic perspective front view of the docking adapter of FIG. 1A from another angle, according to the invention.
Figure 2B:
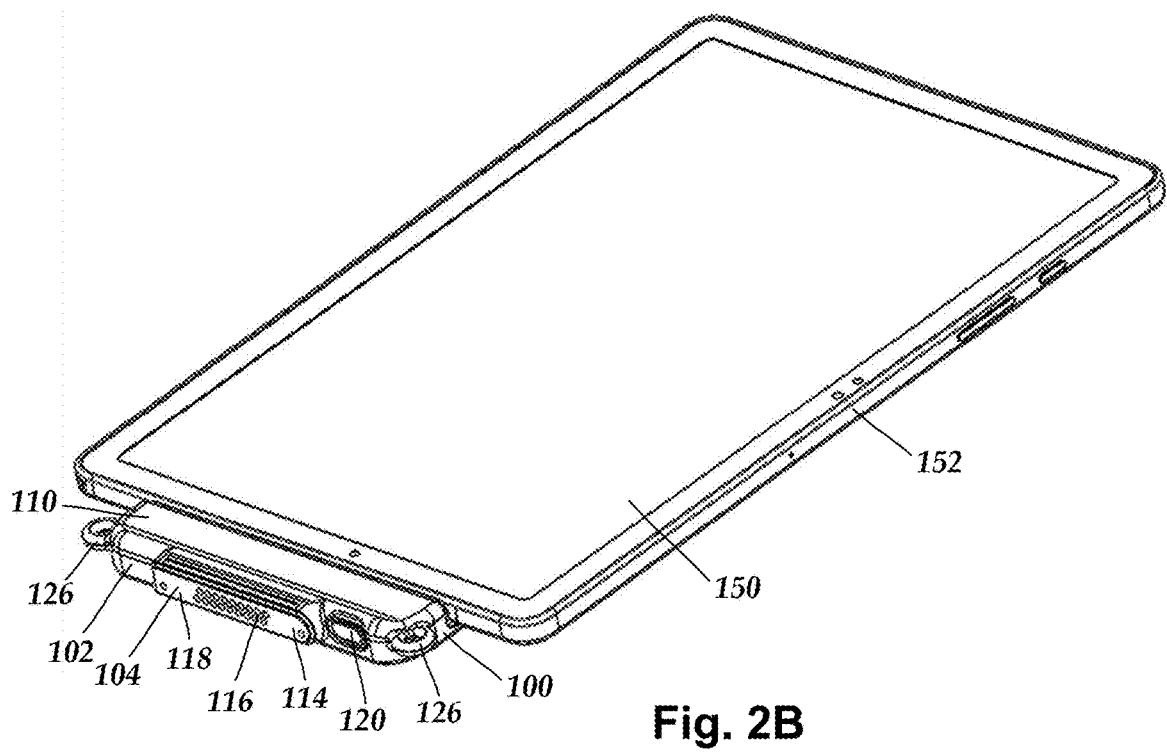
FIG. 2B is a schematic perspective front view of the docking adapter of FIG. 1A and the mobile device contained within a case, according to the invention.

FIGS. 1A, 2A, and 2B illustrate one arrangement of the second contacts 116 of the docking adapter 100. In this arrangement, there are eighteen second contacts 116 arranged in two rows. In the illustrated embodiment, the rows are staggered, but it will be recognized that the rows can be aligned with each other, instead of staggered. It will be understood that the cover 100 can include any number of second contacts 116 including, but not limited to, two, three, four, five, six, seven, eight, nine, ten, twelve, fourteen, sixteen, eighteen, twenty, or more second contracts. The second contacts 116 can be arranged in any regular or irregular pattern. For example, three second contacts 116 can be arranged in a straight line, an equilateral triangle, an isosceles triangle, a right triangle, or any other suitable arrangement. As another example, some or all of the second contacts 116 can be arranged at vertices of a regular or irregular polygon, such as a square, rectangle, rhombus, parallelogram, pentagon, hexagon, octagon, decagon, or the like.

The second contacts 116 are configured for coupling to a dock 160 (FIG. 4), as described below, or other external device. The dock 160 or external device can have the same number and arrangement of electrical contacts although in some embodiments, the dock 160 external device may have fewer or more contacts than the second contacts 116 of the docking adapter 100.

Figure 3A:
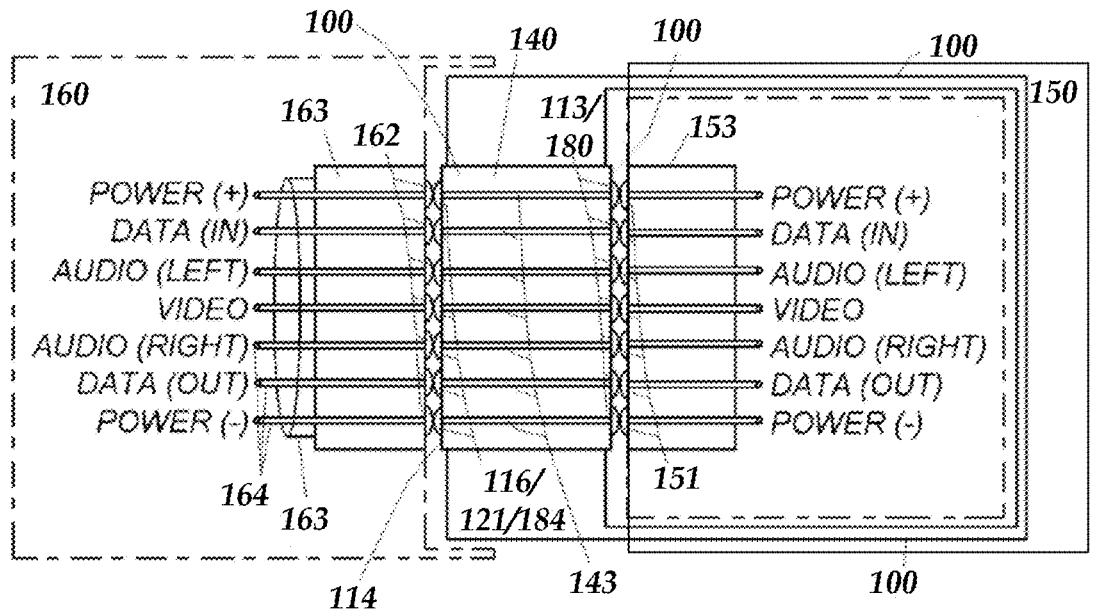
FIG. 3A is a block diagram of one embodiment of connections between a docking adapter, a mobile device, and a dock or other external device, according to the invention.
Figure 5A:
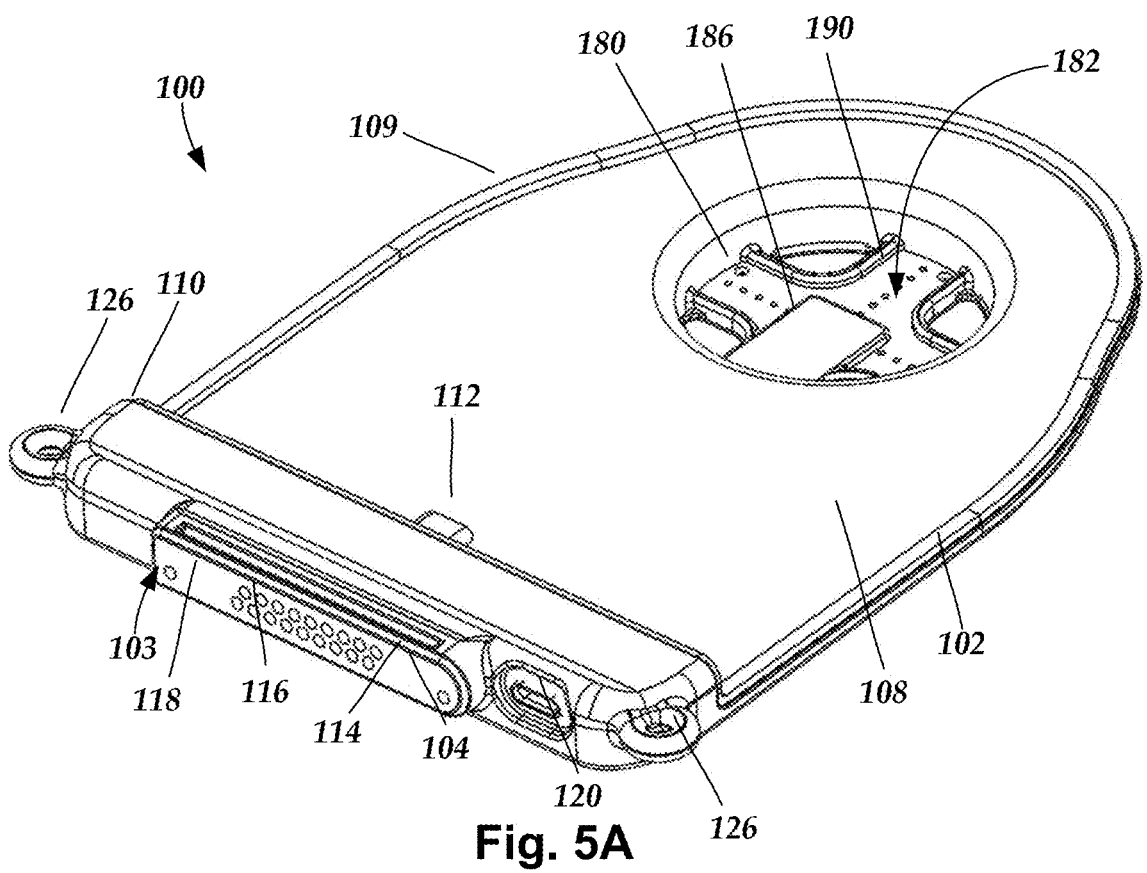
FIG. 5A is a schematic perspective front view of another embodiment of a docking adapter for a mobile device, according to the invention.

FIG. 3A is a block diagram of one embodiment of electrical connection between a docking adapter 100, a mobile device 150, and a dock 160 (or other external device). In this embodiment, the second contacts 116 of the docking adapter 100 are coupled to the first contacts 113 on the male plug 112 through conductors 143 (for example, conductive traces or wires), which are optionally disposed on a circuit board 140 or other substrate. In FIG. 3A, the first and second contacts 113, 116 are sequentially ordered with respect to each other. As illustrated, device contacts 151 of a female (or other) socket 153 of the mobile device 150 are electrically coupled to the first contacts 113 on the male plug 112 of the adapter and dock contacts 162 (which are, optionally, in a female connector 163 or other connector) of the dock 160 (or other external device) are coupled to the second contacts 116 of the docking adapter 100. FIG. 5A illustrates one example of an arrangement 164 of these dock contacts 162 as assigned to particular inputs/outputs. It will be recognized that other assignments of inputs/outputs or arrangements of assignments of inputs/outputs can be used.

Figure 3B:
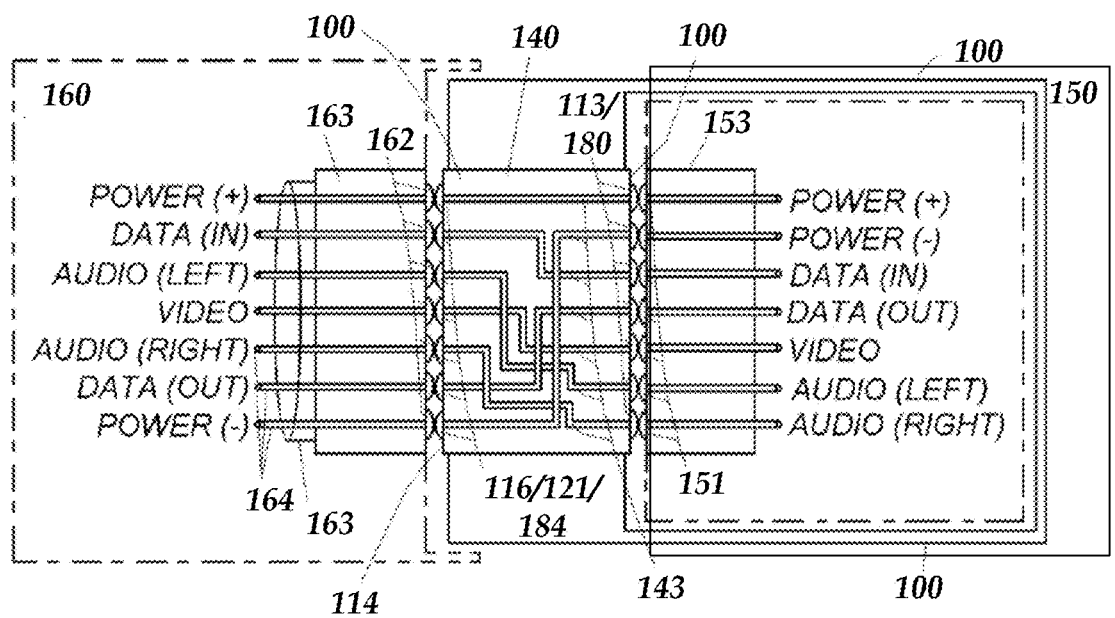
FIG. 3B is a block diagram of another embodiment of connections between a docking adapter, a mobile device, and a dock or other external device, according to the invention.

FIG. 3B is a block diagram of another embodiment of electrical connection between a docking adapter 100, a mobile device 150, and a dock 160 (or other external device). In this embodiment, the second contacts 116 are coupled to the first contacts 113 in a non-sequential relationship with at least some of the conductors 143 overlapping (with intervening insulation). Accordingly, the docking adapter 100 can be used to couple a specific type of mobile device 150 to a universal dock 160 by rearranging the inputs/outputs from the mobile device to the arrangement of inputs/outputs of the universal external device. This allows the universal dock 160 to be used with a variety of mobile devices 150 by selection of the appropriate docking adapter 100 to convert the arrangement of inputs/outputs from the mobile device to the universal dock.

Although FIGS. 3A and 3B illustrate the coupling of the second contacts 116 to the first contacts 113, it will be recognized that a similar arrangement of conductors 143 can be used to couple the contacts 121 of the female connector 120 (or fourth contacts 184 on the docking button 106, as described in more detail below with respect to the embodiments illustrated in FIGS. 6A, 6B, 8A, 8B, 9A, 9B, 9C, and 9D) to the first contacts 113 of the male plug 112 of the docking adapter 100, as illustrated in FIGS. 3A and 3B, (and denoted by the reference "116/121/184" in FIGS. 3A and 3B). In some embodiments, the female connector 120 is identical to the female socket 153 of the mobile device 150. For example, if the female socket 153 of the mobile device 150 is a USB C type socket, then the female connector 120 is also a USB C type socket. In other embodiments, the female connector 120 is a different type or connector, or has a different input/output arrangement, from the female socket 153 of the mobile device 150.

Although FIGS. 3A and 3B illustrate the coupling of the second contacts 116, contacts 121 of the female connector 120, or fourth contacts 184 (or any combination thereof) to the first contacts 113, it will be recognized that a similar arrangement of conductors 143 can be used to couple the second contacts 116, contacts 121, or fourth contacts 184 to third contacts 180 on the docking button 106 (as described in more detail below with respect to the embodiments illustrated in FIGS. 5A, 5B, 7A, and 7B) of the docking adapter 100, as illustrated in FIGS. 3A and 3B, (as denoted by the reference "113/180" in FIGS. 3A and 3B).

In at least some embodiments, the adapter connector 104 (optionally, in conjunction with a portion of the adapter body 102) forms a male structure 118 extending away from the male plug 112 and from adjacent portions of the adapter body, as illustrated in FIG. 1A. In at least some embodiments, the male structure 118 has an asymmetric shape, such as the shape with a straight end on one side and a curved end on the opposing side, as illustrated in FIG. 1A. In at least some embodiments, a dock 160 (FIG. 4) includes a female connector that has a shape similar or complementary to the male structure 118 to facilitate alignment or engagement of the docking adapter 100 with the dock 160.

The docking adapter 100 includes a docking button 106 that is permanently attached to, or permanently part of, the back plate 108 of the adapter body 102. In at least some embodiments, the docking button 106 includes a mounting neck 122 extending away from the back plate 108. The mounting neck 122 has a lateral width that is smaller than a lateral width 124 of the docking button 106. The presence of the mounting neck 122 spaces the radial edge(s) of the docking button 106 away from the back plate 108.

In at least some embodiments, the lateral cross-sectional shape of the docking button 106 is non-circular. Examples of lateral cross-sectional shapes of a docking button 106, include, but are not limited to, circular, oval, triangular, square, rectangular, rhomboidal, trapezoidal, pentagonal, hexagonal, octagonal (as illustrated in FIG. 2A), decagonal, or the like. In at least some embodiments, the lateral cross-sectional shape of the docking button 106 is polygonal, regular polygonal, or irregular polygonal.

In at least some embodiments, the docking adapter 100 is removably attachable to the case 152 or the mobile device 150. In at least some embodiments, the docking adapter 100 include adhesive for attaching the docking adapter to the mobile device 150 or the case 152. In at least some embodiments, the adhesive is a pressure-sensitive adhesive. In at least some embodiments, the adhesive is a reworkable adhesive. In at least some embodiments, the adhesive is a permanent adhesive. In at least some embodiments, the adhesive may be covered by a protective substrate (e.g., a release liner) that can be removed to expose the adhesive.

In at least some embodiments, the adhesive is disposed on the rim 109, the back plate 108, or the connector housing 104 or any combination thereof. In at least some embodiments, when the docking adapter 100 is attached to the mobile device 150 or case 152, the adhesive and docking adapter form a seal against the mobile device 150 or case 152. In at least some embodiments, the seal is a water-resistant or waterproof seal. In at least some embodiments, the seal formed by the docking adapter 100 against the mobile device 150 or case 152 allows the docking adapter and mobile device to be cleaned or sterilized, for example, using one or more cleaning solvents or liquids, without damaging the mobile device. In at least some embodiments with a female connector 120, the female connector is a water-resistant or waterproof connector.

Figure 4:
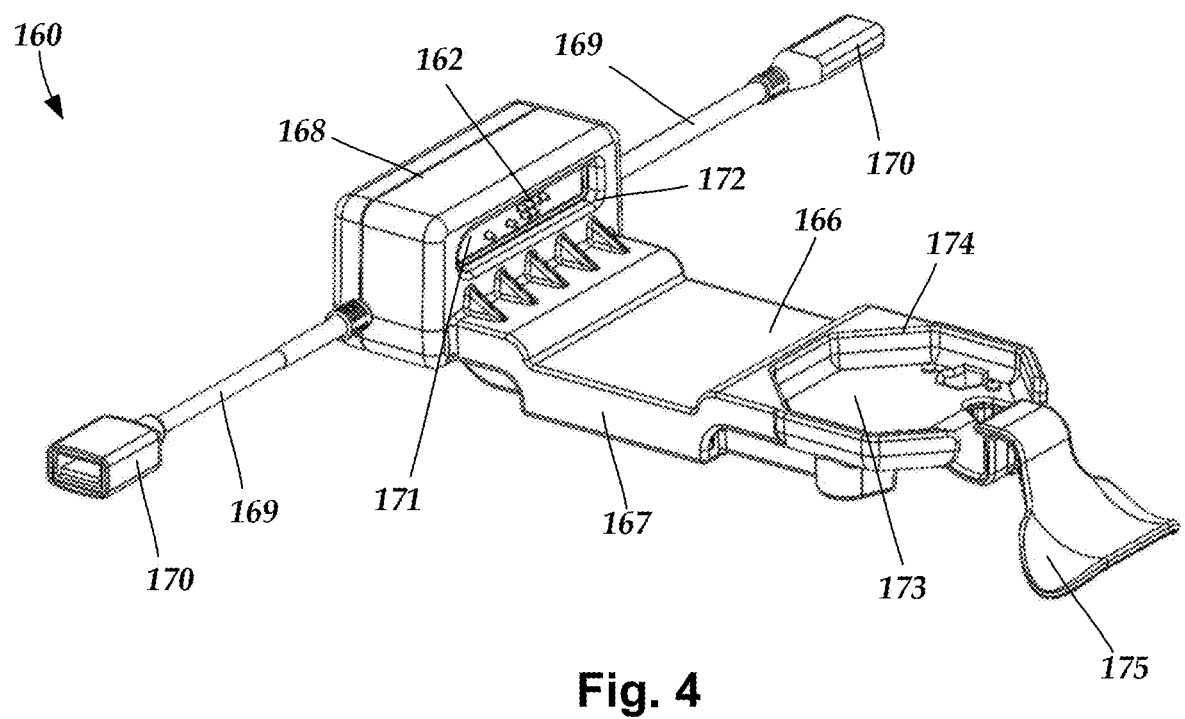
FIG. 4 is a side perspective view of one embodiment of a dock for use with a docking adapter, according to the invention.

FIG. 4 illustrate one embodiment of a dock 160 for receiving the mobile device 150 with the docking adapter 160 attached thereto. The dock 160 is illustrative. Any other suitable dock can be used with the docking adapter 160. The dock 160 of FIG. 4 includes a dock body 166 having a cradle base 167 and a bottom device receiver 168 coupled to, or part of, the cradle base 167. In at least some embodiments, the cradle 160 includes one or more optional connector cords 169 extending from the cradle body 166 such as, for example, extending from the bottom device receiver 168. In at least some embodiments, the cradle 160 includes one or more optional connectors 170 attached to each optional connector cord 169. Other cradles may have more or fewer components. In at least some embodiments, the cradle 160 includes a latch 112.

The bottom device receiver 168 includes one or more contacts 162 for making contact with second contacts 116 on the docking adapter 100. Any arrangement of the contacts 162 can be used including, but not limited to, an arrangement of the contacts in one or more rows. In at least some embodiments, the contacts 162 are pogo pins or other biasing contacts that can move up or down relative to the cradle body 166 such as, for example, the bottom device receiver 168.

In at least some embodiments, the bottom device receiver 168 which includes a recess 171 surrounded by a rim 172 that may facilitate retention of the mobile device in the docking adapter 160. In at least some embodiments, the recess 171, rim 172, and contacts 162 form a female connector. In at least some embodiments, the shape of the recess 171 and rim 172 are complementary to a male structure 118 of the docking adapter 100, as illustrated in FIG. 4.

The cradle base 167 defines a docking button indentation 173 to receive the docking button 106 of the docking adapter 100. In at least some embodiments, the lateral cross-sectional shape of the docking button 106 and the indentation perimeter 174 or cross-sectional shape of the docking button indentation 173 are non-circular, including those shapes described above with respect to the docking button 106. In at least some embodiments, the docking button indentation 173 has an indentation perimeter 174 or cross-sectional shape that is complementary to the lateral cross-sectional shape of the docking button 106 of the docking adapter 100. In at least some embodiments, this complementary arrangement facilitates maintaining alignment of the docking adapter 100 and the dock 160 because the docking button 106 is not rotatable when received in the docking button indentation 173.

A dock 160 can include a latch 175 for engaging the docking button 106 to maintain the attachment of the docking adapter 100 to the dock. Examples of docks and latches can be found in U.S. patent application Ser. No. 18/590,837, which is incorporated herein by reference in its entirety.

Figure 5B:
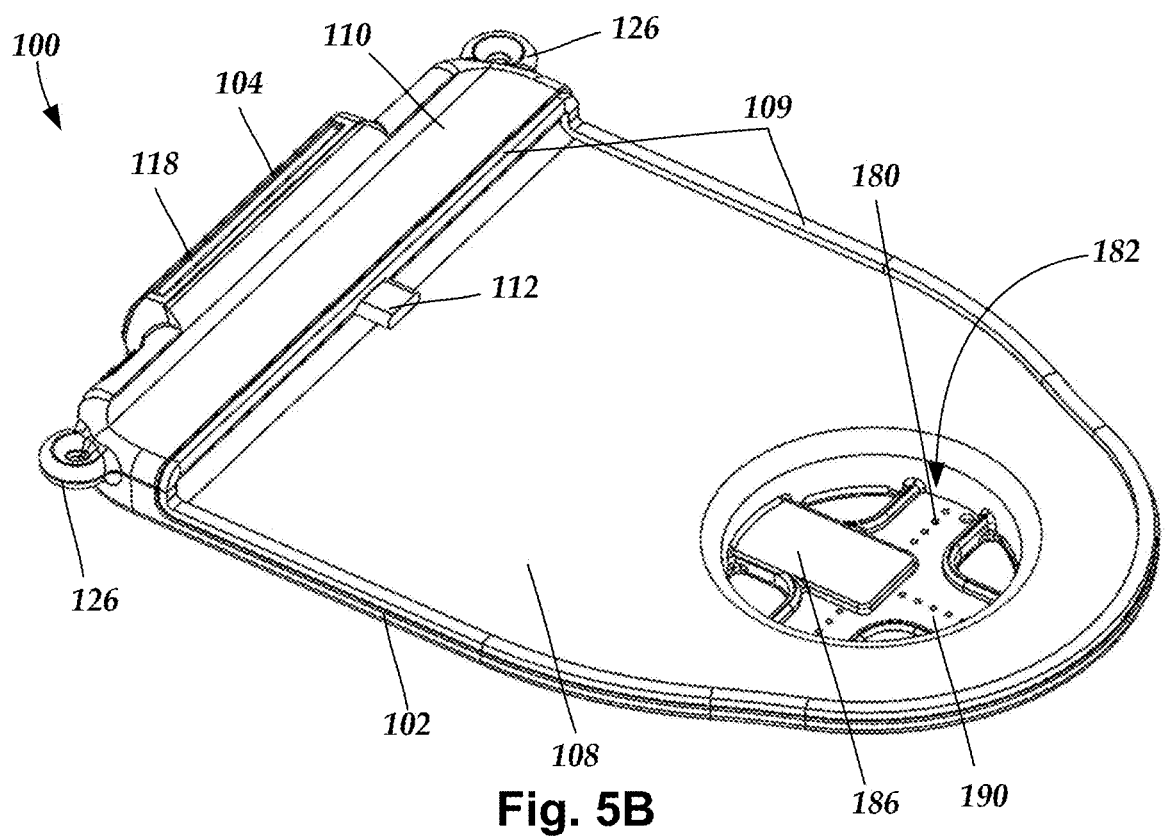
FIG. 5B is a schematic perspective front view of the docking adapter of FIG. 5A from another angle, according to the invention.

FIGS. 5A, 5B, 6A, and 6B illustrate another embodiment of a docking adapter 100. In at least some embodiments, in addition to the elements of the previous embodiment of the docking adapter, the docking adapter 100 of FIGS. 5A and 5B includes third contacts 180 on the adapter body 102 for electrically coupling to contacts on a back surface 154 of the case 152 or mobile device 150. In at least some embodiments, the back plate 108 of the adapter body 102 includes a depression 182 within which the third contacts 180 are disposed, as illustrated in FIGS. 5A and 5B. In at least some embodiments, the depression 182 is configured to receive a protrusion on the back surface 154 of the case 152 or mobile device 150 upon which contacts are disposed. Examples of a cases 152 with contacts and a protrusion on a back surface 154 for engagement with the third contacts 180 of the docking adapter of FIGS. 5A, 5B, 6A, and 6B can be found in FIGS. 25, 26, 28-30, and 32, and the accompanying portions of the specification of U.S. Pat. No. 9,195,279, which is incorporated herein by reference in its entirety. In at least some embodiments with third contacts 180, there is no male plug 112 and the mobile device 150 is electrically coupled to the docking adapter 100 through the third contacts 180. In other embodiments, the mobile device 150 is electrically coupled to the docking adapter 100 through either, or both, of the first contacts 113 of the male plug 112 or the third contacts 180.

Figure 6A:
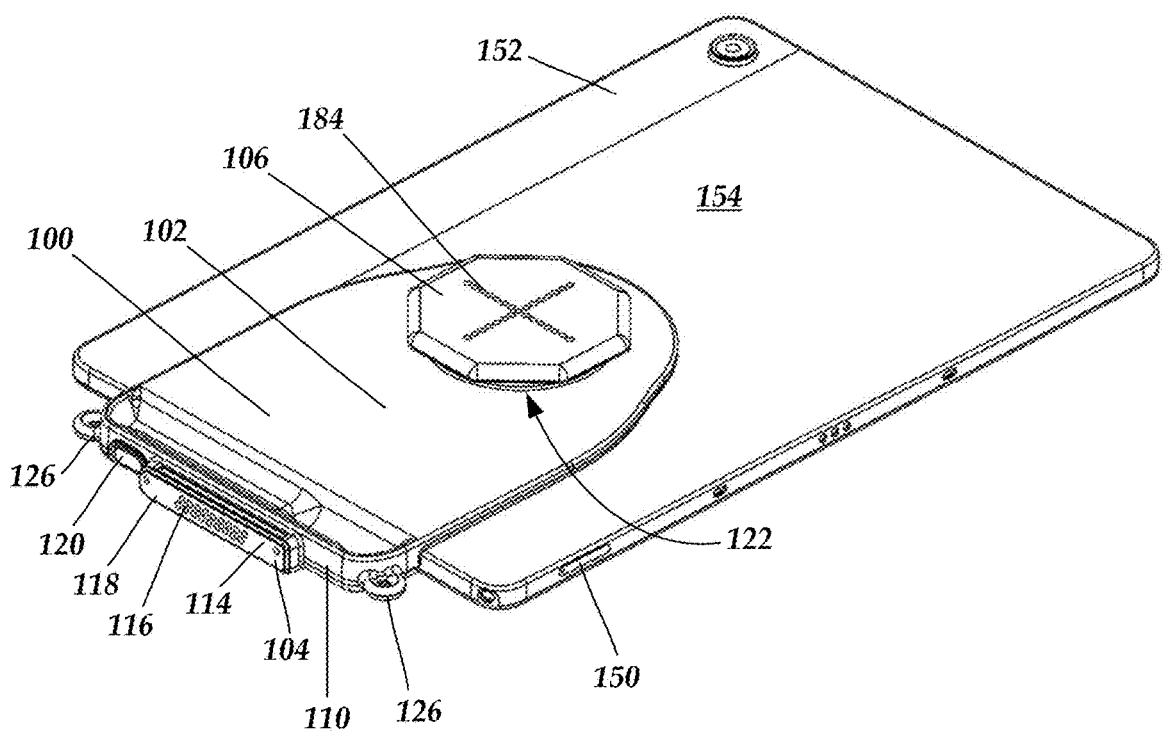
FIG. 6A is a schematic perspective back view of the docking adapter of FIG. 5A and a mobile device contained within a case, according to the invention.
Figure 6B:
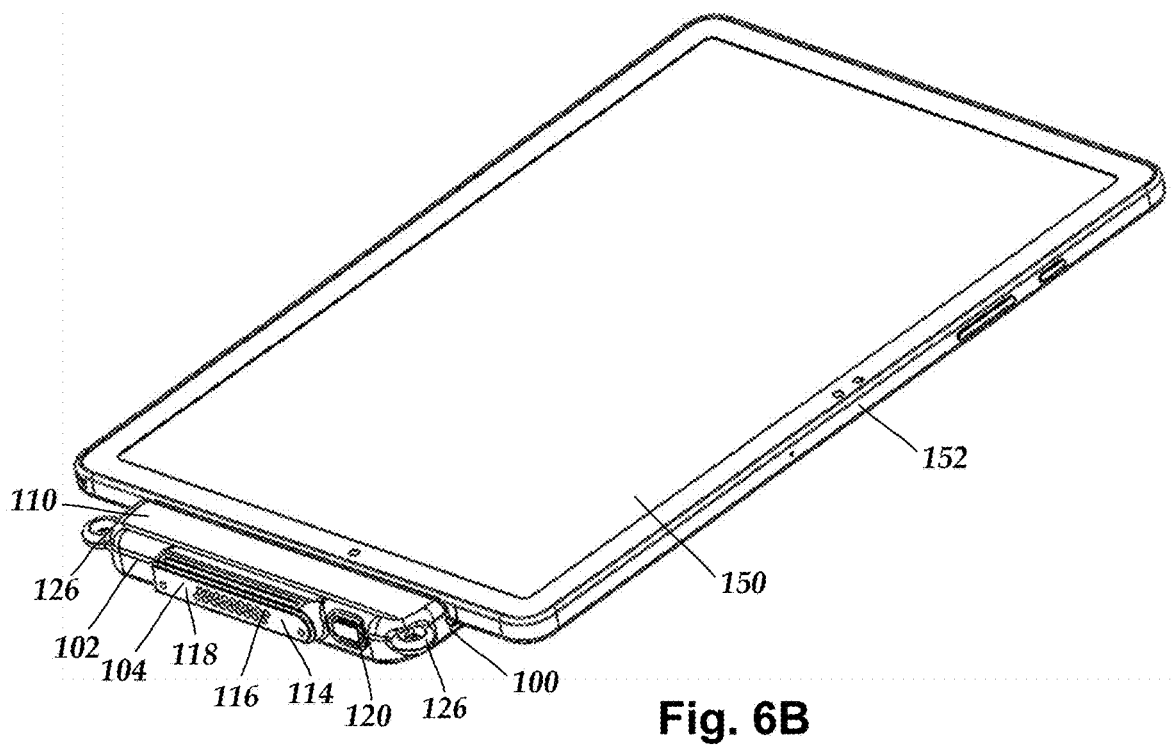
FIG. 6B is a schematic perspective front view of the docking adapter of FIG. 5A and the mobile device contained within a case, according to the invention.
Figure 7A:
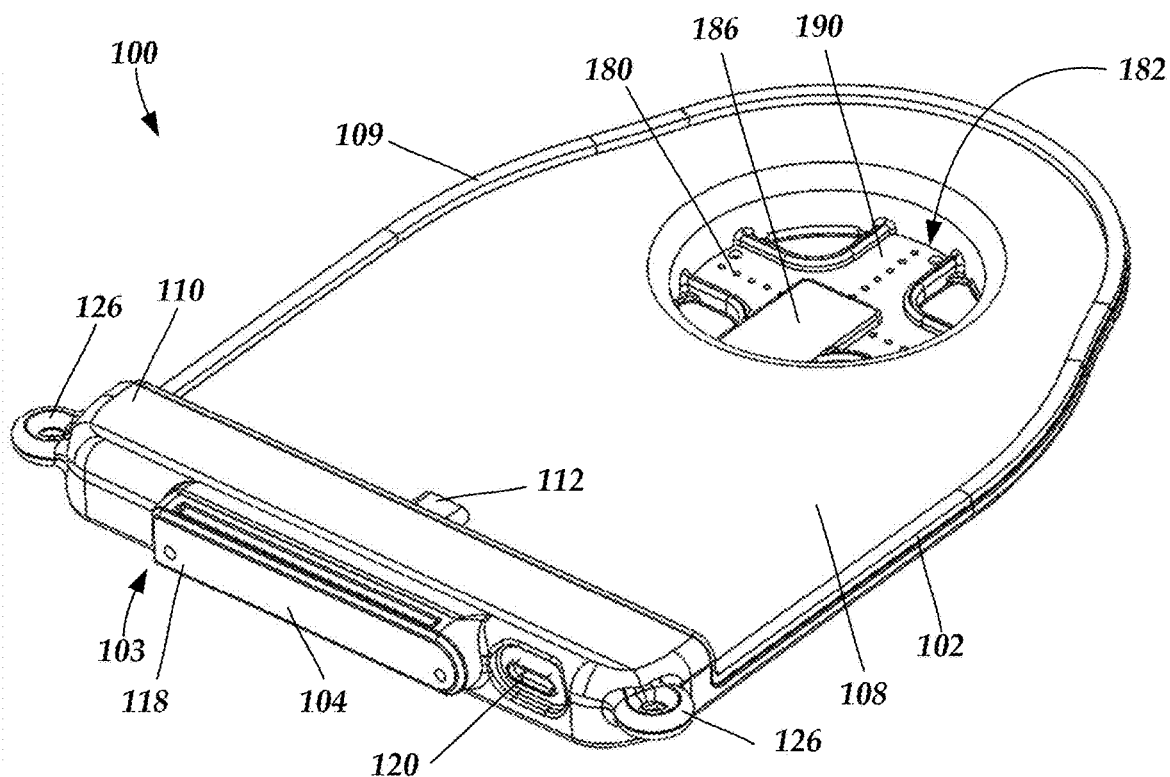
FIG. 7A is a schematic perspective front view of yet another embodiment of a docking adapter for a mobile device, according to the invention.
Figure 7B:
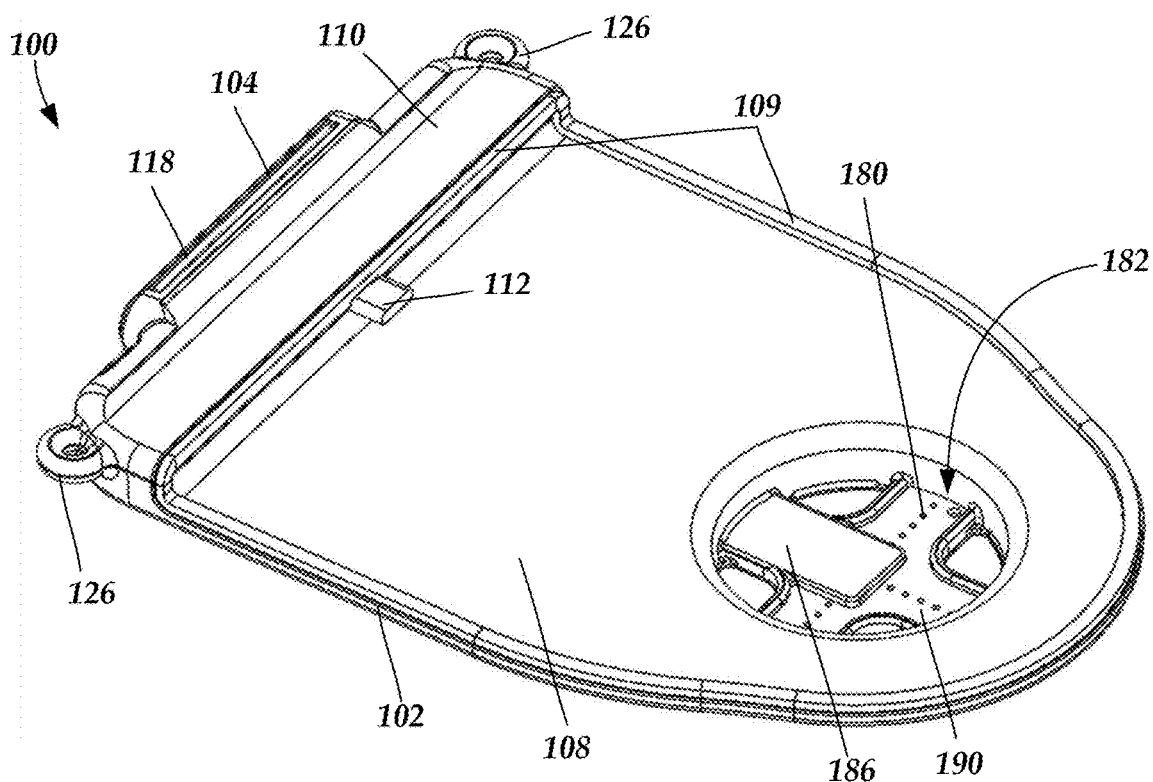
FIG. 7B is a schematic perspective front view of the docking adapter of FIG. 7A from another angle, according to the invention.
Figure 8A:
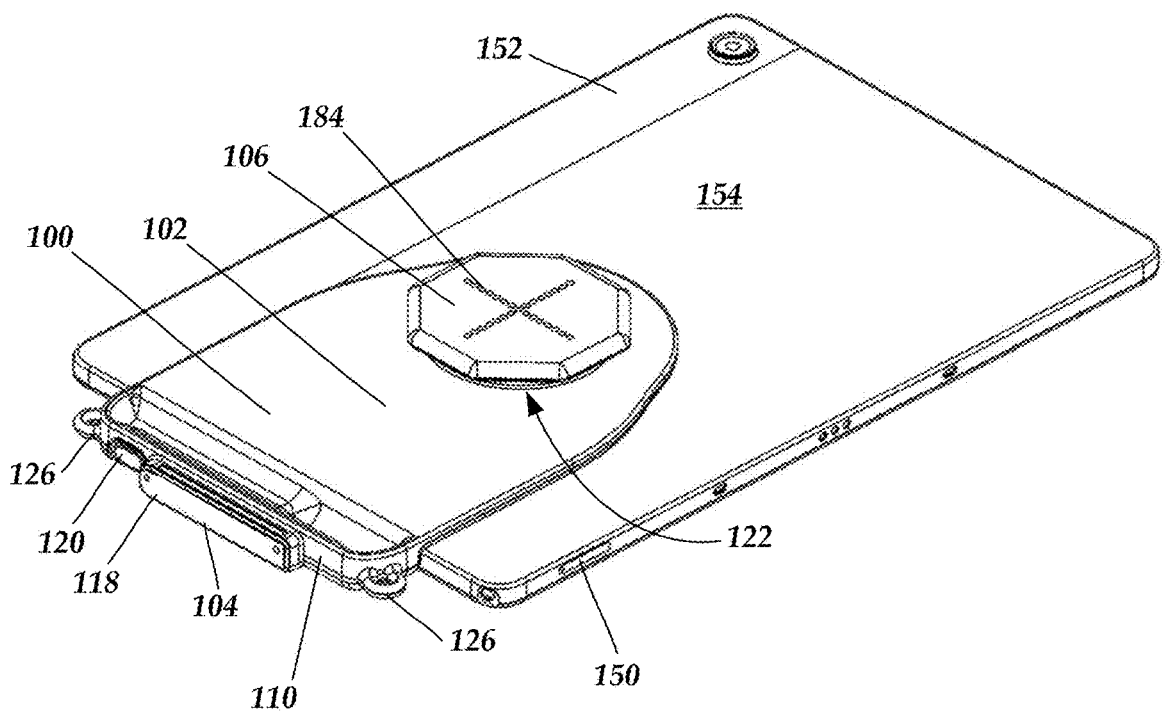
FIG. 8A is a schematic perspective back view of the docking adapter of FIG. 7A and a mobile device contained within a case, according to the invention.
Figure 8B:
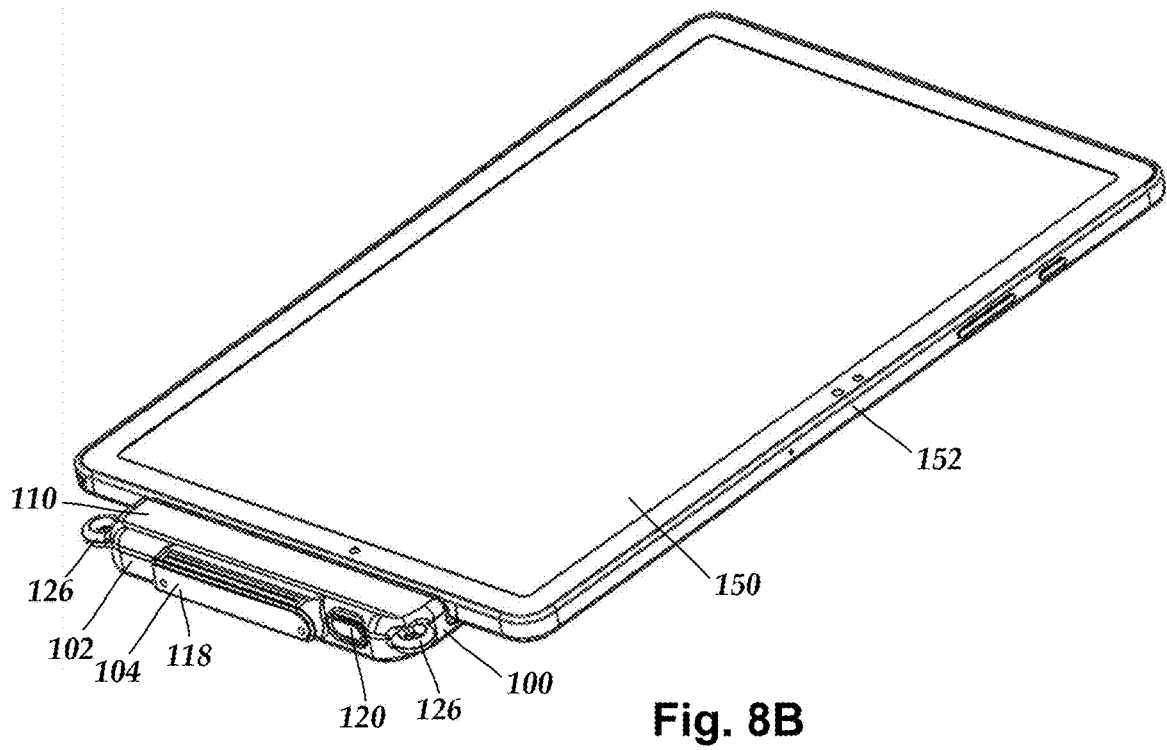
FIG. 8B is a schematic perspective front view of the docking adapter of FIG. 7A and the mobile device contained within a case, according to the invention.

In at least some embodiments, the docking button 106 includes fourth contacts 184, as illustrated in FIGS. 6A and 6B, for coupling to a dock 160 or other external device which has contacts arranged for engaging the contacts on a docking button 106. Examples of such docks 160 or other external device can be found below with respect to FIGS. 10A, 10B, and 10C, as well as in FIGS. 24, 27, and 31, and the accompanying portions of the specification of U.S. Pat. No. 9,195,279, which is incorporated herein by reference in its entirety. In at least some embodiments, the docking adapter 100 includes both third and fourth contacts 180, 184 that are electrically coupled to each other. In other embodiments, the docking adapter 100 includes fourth contacts 184, but not the third contacts 180, with the fourth contacts electrically coupled to the first contacts 113 of the male plug 112. In at least some embodiments, either the third contacts 180 or the fourth contacts 184 (or both sets of contacts) are biasing contacts, such as pogo pins or the like.

The third contacts 180 or the fourth contacts 184 can be disposed in any suitable arrangement. In the illustrated embodiment of FIGS. 5A and 5B, the third contacts 180 are arranged in four lines of contacts disposed at ninety degree intervals around the circular depression 182. In the illustrated embodiment of FIGS. 6A and 6B, the fourth contacts 184 are arranged in two intersecting, orthogonal lines. Any other suitable arrangement can be used including, but not limited to, one or more columns or rows, vertices of a polygon, a set of concentric rings, or the like or any combination thereof.

FIGS. 7A, 7B, 8A, and 8B illustrate a further embodiment of a docking adapter 100 that includes the fourth contacts 184 on the docking button 106 but does not include the second contacts 116 on the connector adapter 104. In at least some of these embodiments, the docking adapter 100 also includes the third contacts 180 for electrically coupling to the mobile device 150 and may or may not include a male plug 112. In at least some embodiments with fourth contacts 184 on the docking button 106, the docking adapter 100 includes a male plug 112 with the first contacts 113 for electrically coupling to the mobile device 150.

FIGS. 9A, 9B, 9C, and 9D illustrates yet another embodiment of a docking adapter 100 that includes the fourth contacts 184 on the docking button 106 but does not include the second contacts 116 on the connector adapter 104. In this embodiment, the connector adapter 104 is arranged to extend along a portion of the back surface 154 of the mobile device 150 or case 152. It will be understood that the other embodiments of the docking adapter 100 disclosed herein can be modified so that the connector adapter 104 is arranged to extend along a portion of the back surface 154 of the mobile device 150 or case 152.

Figure 9A:
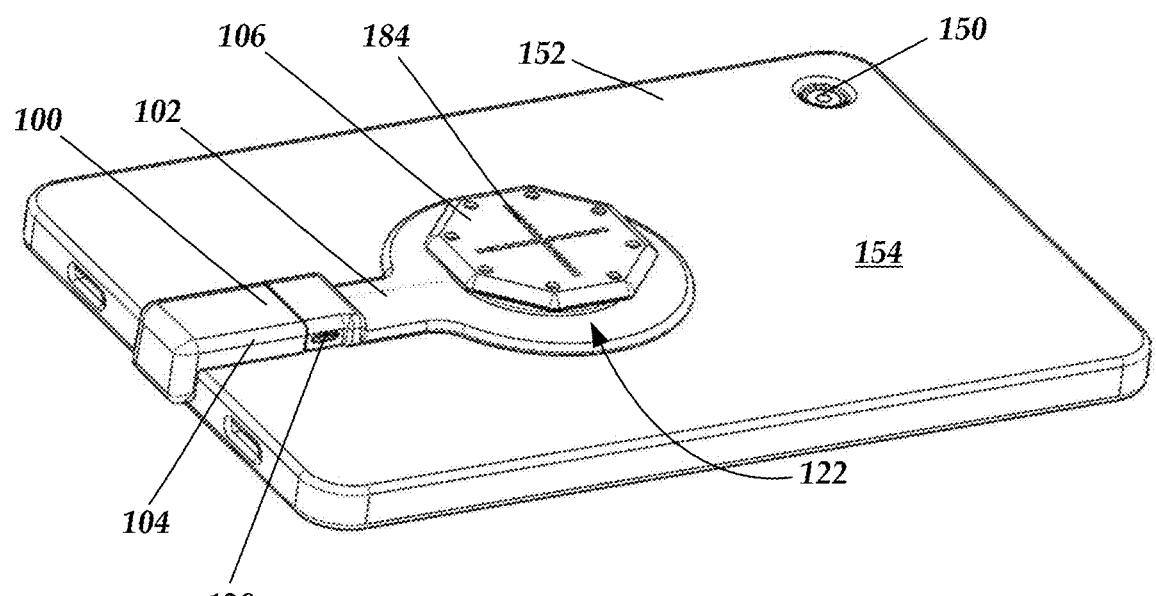
FIG. 9A is a schematic perspective back view of a further docking adapter and a mobile device contained within a case, according to the invention.
Figure 9B:
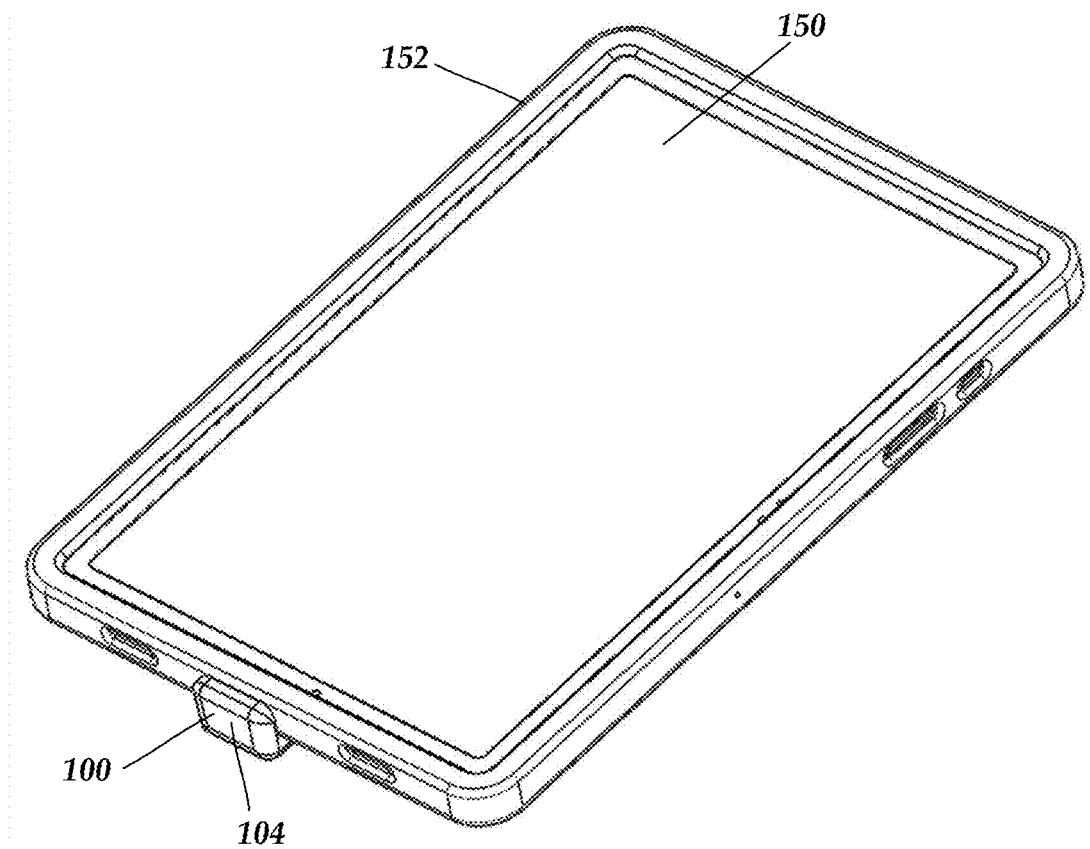
FIG. 9B is a schematic perspective front view of the docking adapter of FIG. 9A and the mobile device contained within a case, according to the invention.
Figure 9C:
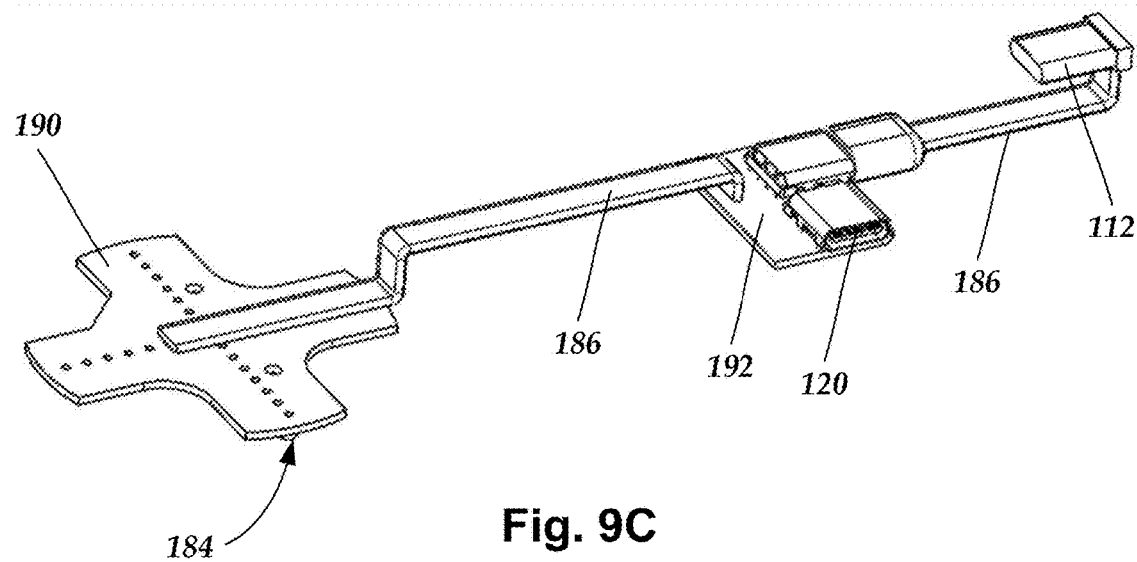
FIG. 9C is a schematic perspective front view of internal components of the docking adapter of FIG. 9A, according to the invention.
Figure 9D:
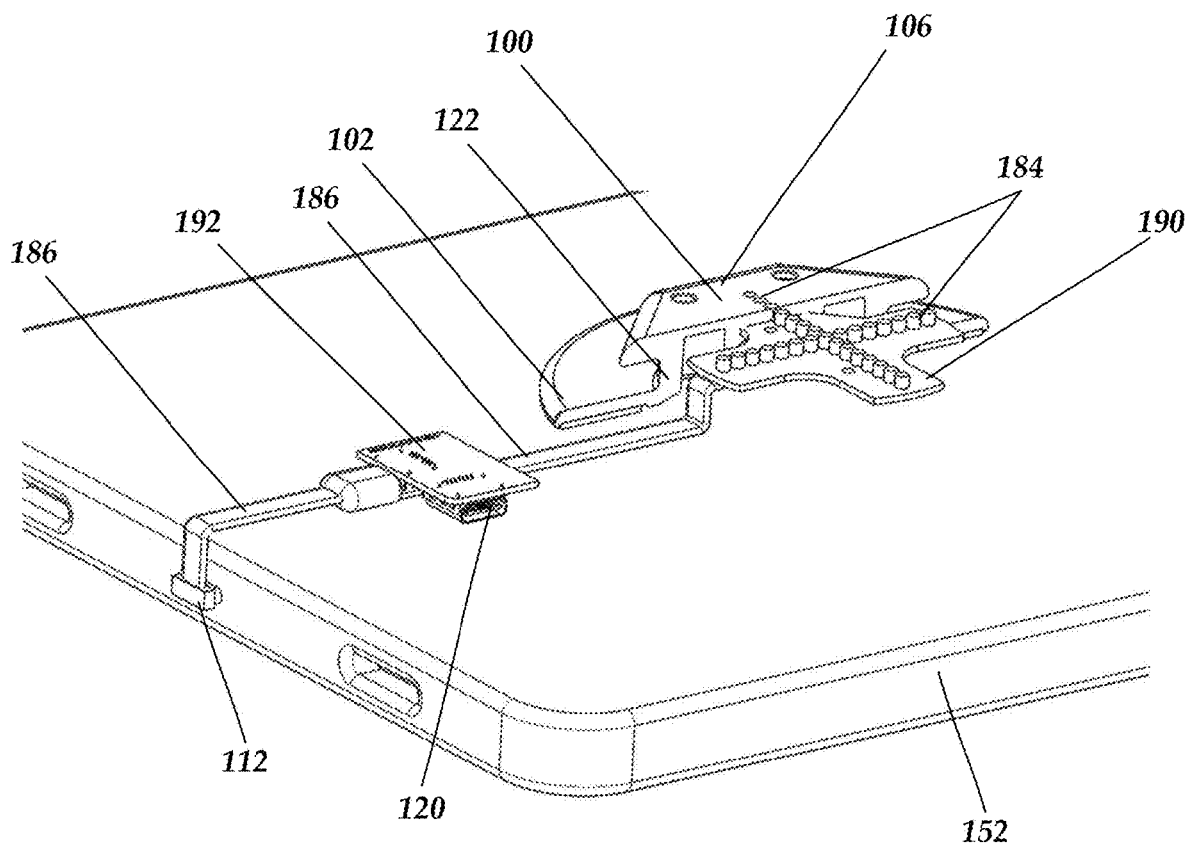
FIG. 9D is a schematic perspective cross-sectional back view of the docking adapter of FIG. 9A disposed on the mobile device contained within a case, according to the invention.

In at least some embodiments, the optional female connector 120 is positioned so that, when the docking adapter 100 is coupled to the mobile device 150, the female connector is adjacent to the back surface 154 of the mobile device or case 152, as illustrated in FIGS. 9A, 9B, and 9D. It will be understood that the other embodiments of the docking adapter 100 disclosed herein can be modified so that the female connector 120 is adjacent to the back surface 154 of the mobile device or case 152.

FIGS. 9C and 9D illustrate the docking adapter 100 with at least a portion of the adapter body 102 and the docking button 106 removed to illustrate internal components of the docking adapter. The docking adapter 100 includes one or more conductor supports 186 (which is also partially illustrated in FIGS. 5A and 5B) for carrying or supporting conductors 143 (FIGS. 3A and 3B) between the male plug 112 and the fourth contacts 184 (or the third contacts 180, when present). In the illustrated embodiment, there are two conductor supports 186 with the first conductor support supporting conductors 143 (FIGS. 3A and 3B) between the male plug 112 and an intermediate connector structure 192 to which the female connector 120 is attached (and electrically coupled to the fourth contacts 184). The second conductor support supports conductors 143 between the intermediate connector structure 192 and the fourth electrodes 184. This arrangement electrically couples the first electrodes 113 (FIGS. 3A and 3B) on the male plug 112 and the fourth contacts 184 (as well as, in at least some embodiments, between the contacts 121 (FIGS. 3A and 3B) on the female connector 120 and the fourth contacts). Any suitable conductors 143 can be used including, but not limited to, wires, conductive traces, or the like or any combination thereof. Any suitable conductor support 186 can be used including, but not limited to, a printed circuit board, any other suitable substrate, a cable housing, or the like or any combination thereof. (In some embodiments, conductor supports 186 are not used and conductor 143, such as wires, run between components of the docking adapter 100.) In at least some embodiments, either, or both, of the third contacts 180 (FIGS. 5A and 5B) or fourth contacts 184 can be disposed on a substrate 190, such as a printed circuit board or the like. It will be understood that this arrangement, the conductor supports 186, the conductors 143, the intermediate connector structure 192, or any combination thereof can be used in any of the other embodiments of the docking adapter 100 disclosed herein.

Figure 10A:
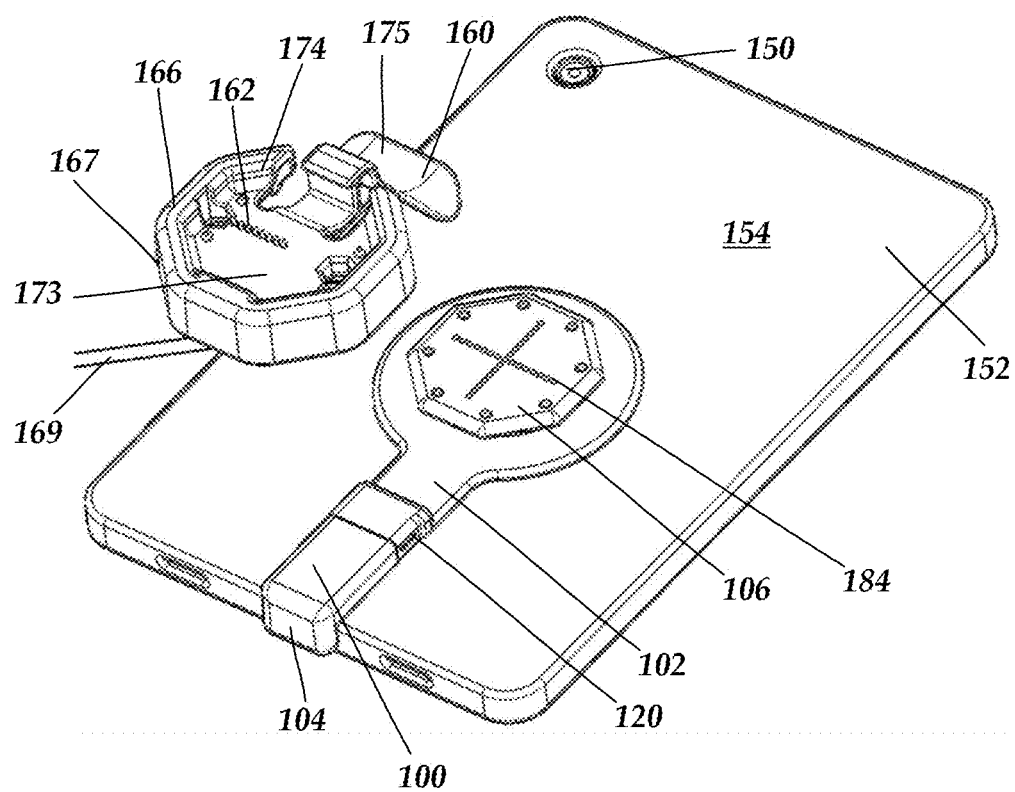
FIG. 10A is a schematic perspective back view of the docking adapter of FIG. 9A and the mobile device contained within a case and front view of one embodiment of a dock, according to the invention.
Figure 10B:
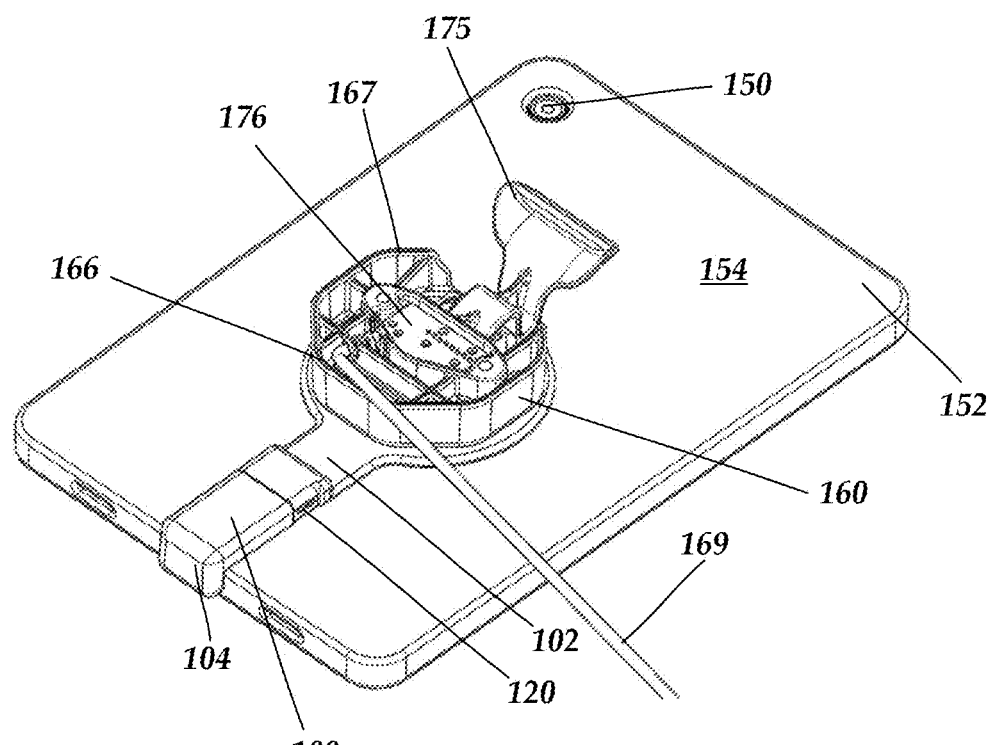
FIG. 10B is a schematic perspective front view of the docking adapter of FIG. 9A and the mobile device contained within a case and back view of the dock of FIG. 10A coupled to the docking adapter, according to the invention.
Figure 10C:
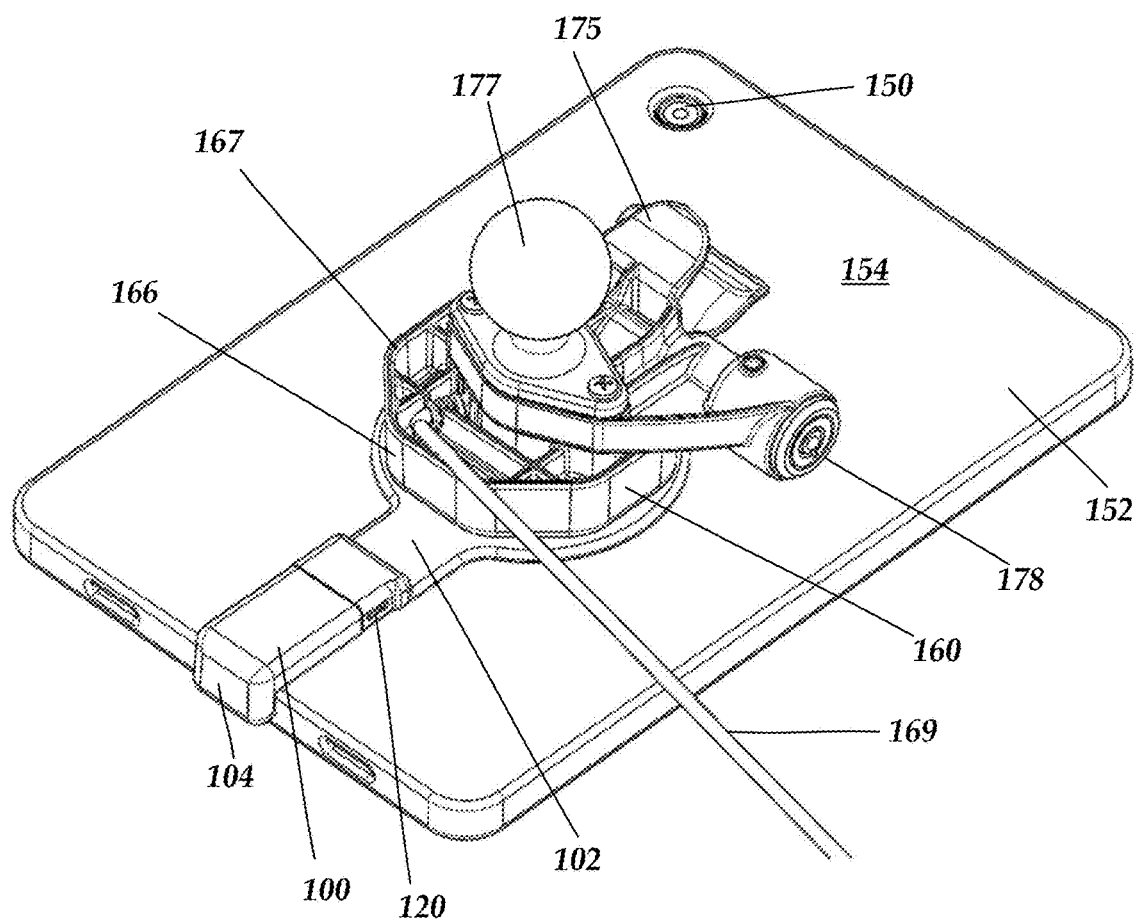
FIG. 10C is a schematic perspective front view of the docking adapter of FIG. 9A and the mobile device contained within a case and back view of the dock of FIG. 10A coupled to the docking adapter and including a mount and latch lock, according to the invention.

FIGS. 10A, 10B, and 10C illustrate the docking adapter 100 of FIGS. 9C to 9D before and after coupling to another embodiment of a dock 160. The dock 160 of FIGS. 10A, 10B, and 10C includes a dock body 166 having a cradle base 167, one or more contacts 162 for making contact with the fourth contacts 184 on the docking button 106 of the docking adapter 100, a connector cord 169, and a latch 175. The cradle base 167 defines a docking button indentation 173, with an indentation perimeter 174, to receive the docking button 106 of the docking adapter 100. The docking button indentation 173 and indentation perimeter 174 are discussed above with respect to the dock 160 of FIG. 4. It will be understood that the dock 160 of FIGS. 10A, 10B, and 10C can be used with any of the embodiments of the docking adapter 100 (or a modified version of the docking adapter) disclosed herein.

In at least some embodiments, the dock 160 includes a mount support 176, as illustrated in FIG. 10B, for attachment of a mount 177, as illustrated in FIG. 10C. Non-limiting examples of mounts can be found at U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference in their entireties.

In at least some embodiments, the latch 175 of the dock 160 includes a latch lock 178, as illustrated in FIG. 10C, to hinder or prevent undesired operation of the latch to disengage the dock 160 from the docking adapter 100. Examples of docks, latches, and latch locks can be found in U.S. patent application Ser. No. 18/590,837, which is incorporated herein by reference in its entirety.

The docking adapter 100 of the preceding embodiments include a docking button 106, which, in at least some embodiments, is a male body that can be inserted into a female docking button indentation 173 of a dock 160. It will be understood that this male-female arrangement can be inverted so that the docking adapter 100 includes a female receptacle and the dock 160 includes a male body. It will be understood that any of the embodiments described hereinabove can be modified to replace the docking button 106 with a female docking button indentation 144 (described in more detail below) for engaging a dock 160 with a docking button 194 (as described in more detail below).

Figure 11A:
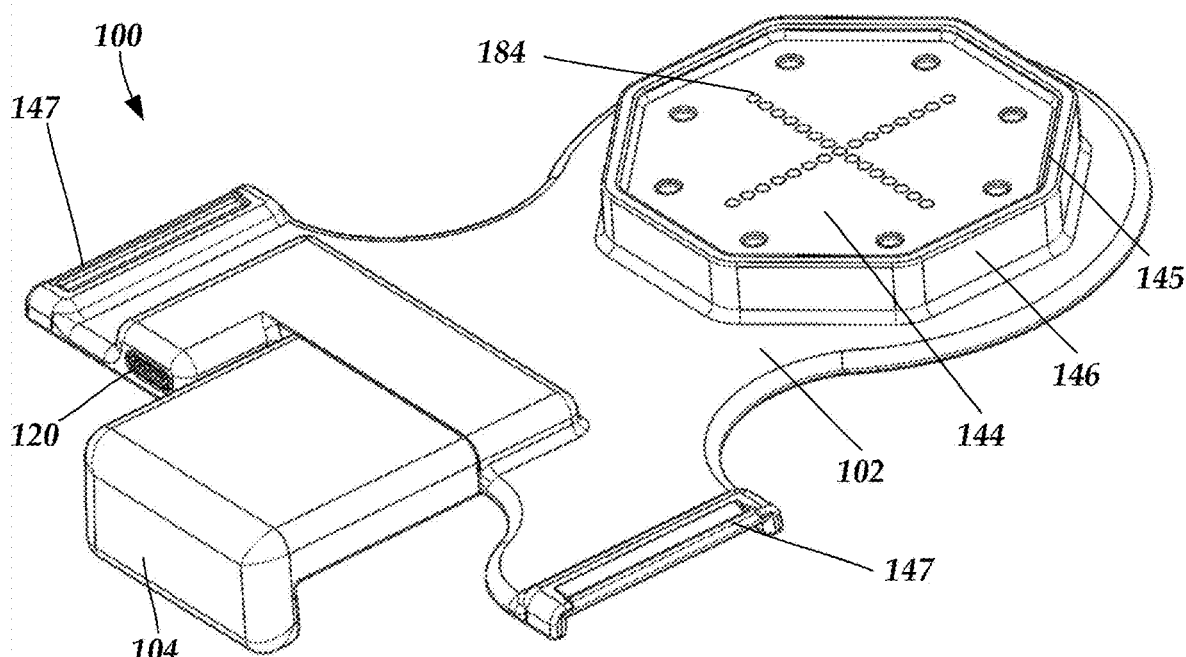
FIG. 11A is a schematic perspective back view of yet another docking adapter and a mobile device contained within a case, according to the invention.
Figure 11B:
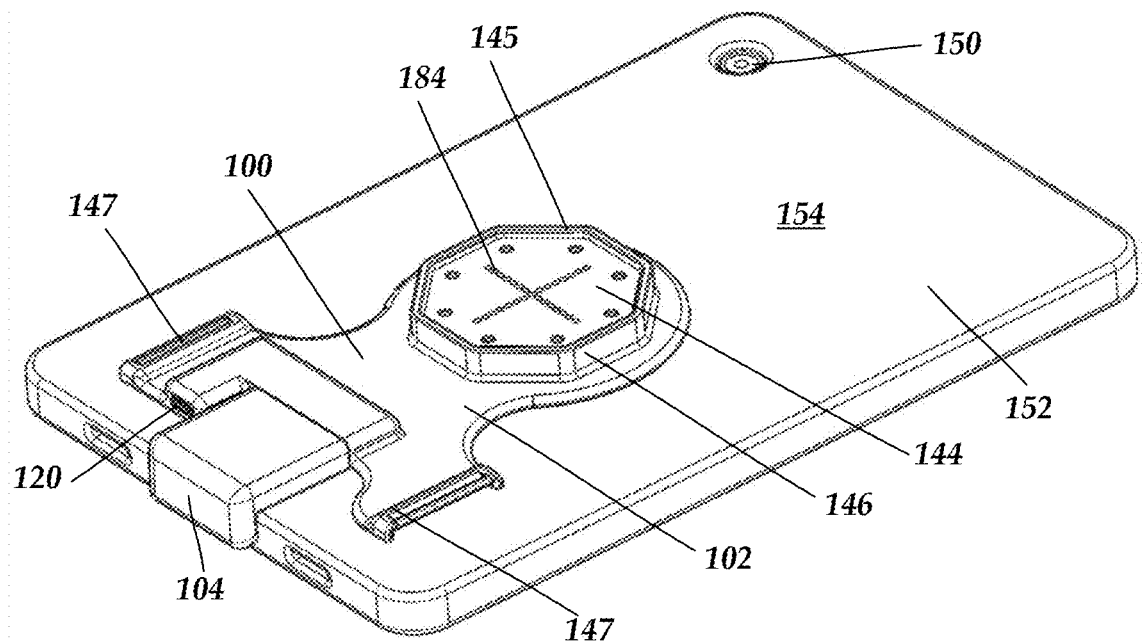
FIG. 11B is a schematic perspective back view of the docking adapter of FIG. 11A and the mobile device contained within a case, according to the invention.
Figure 11C:
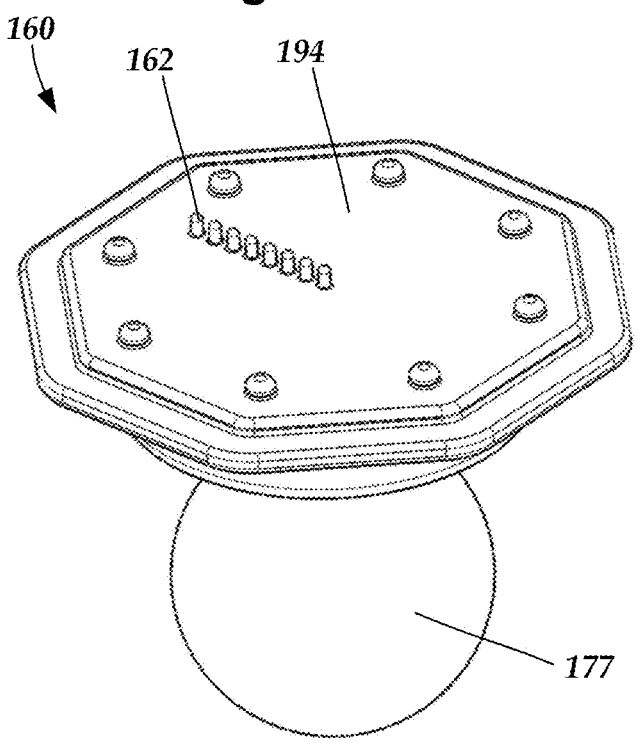
FIG. 11C is a schematic perspective bottom view of a dock for use with the docking adapter of FIG. 11A, according to the invention.
Figure 11D:
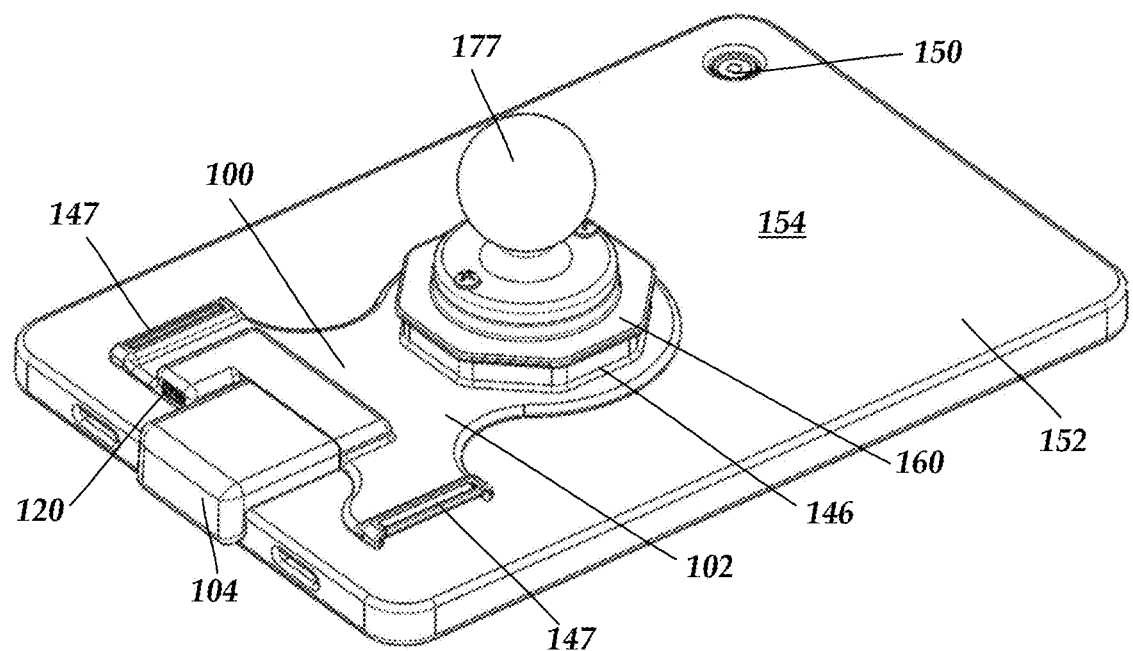
FIG. 11D is a schematic perspective back view of the docking adapter of FIG. 11A, the mobile device contained within a case, and the dock of FIG. 11C, according to the invention.
Figure 11E:
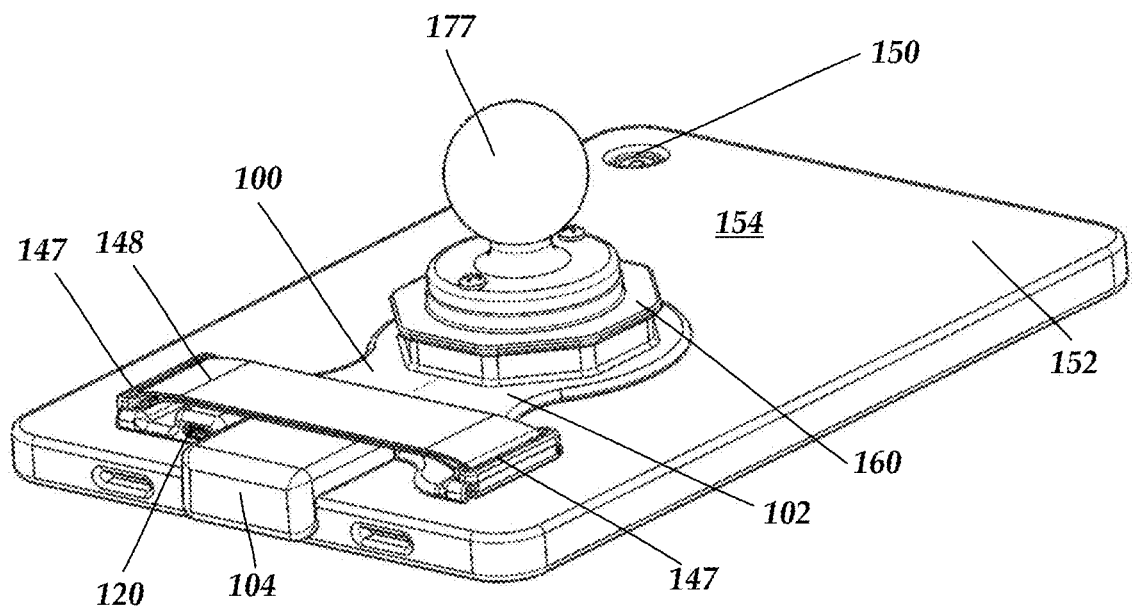
FIG. 11E is a schematic perspective back view of the docking adapter of FIG. 11A with a strap, the mobile device contained within a case, and the dock of FIG. 11C, according to the invention

FIGS. 11A to 11G illustrates another embodiment of a docking adapter 100, which can include any of the elements of the other docking adapter embodiments described above, that has a female docking button indentation 144, as illustrated in FIGS. 11A and 11B, for receiving a docking button 194, as illustrated in FIG. 11C, of a dock 160 or other external device, such as a device with a mount 177, as illustrated in FIGS. 11D and 11E. In at least some embodiments, the fourth contacts 184 are disposed in the docking button indentation 144. In at least some embodiments, the docking button indentation 144 is defined, at least in part, by a rim 145 defining an indentation perimeter. In at least some embodiments, the lateral cross-sectional shape or shape of the indentation perimeter of the docking button indentation 144 is non-circular. Examples of lateral cross-sectional shapes or shapes of the indentation perimeter of a docking button indentation 144, include, but are not limited to, circular, oval, triangular, square, rectangular, rhomboidal, trapezoidal, pentagonal, hexagonal, octagonal (as illustrated in FIG. 11A), decagonal, or the like. In at least some embodiments, the lateral cross-sectional shape or shape of the indentation perimeter of the docking button indentation 144 is polygonal, regular polygonal, or irregular polygonal. In at least some embodiments, the docking button indentation 144 is defined, or mounted, on a platform 146 that extends from, or is part of, the adapter body 102.

The docking button 194 of the dock 160 or other external device can be the same or similar to the docking button 106 of the docking adapter, as described above, including, but not limited to, the provision of contacts 162 on the docking button, as illustrated in FIG. 11C. In at least some embodiments, the docking button 194 has a lateral cross-sectional shape that is complementary to the lateral cross-sectional shape or shape of the indentation perimeter of the docking button indentation 144. In at least some embodiments, the lateral cross-sectional shape of the docking button 194 is any of the shapes listed above for the docking button indentation 144. In at least some embodiments, the docking button 194 can include a mount support 176 configured for receiving a mount 177.

In at least some embodiments, the docking adapter 106 with a docking button indentation 144 includes a lever, such as the lever 175 of the dock 160 of FIG. 4, to couple the docking adapter 106 to a dock 160 or other external device. Any other suitable coupling arrangement can be used for coupling the docking adapter 106 to a dock 160 or other external device and any combination of coupling arrangements can be used.

Figure 11F:
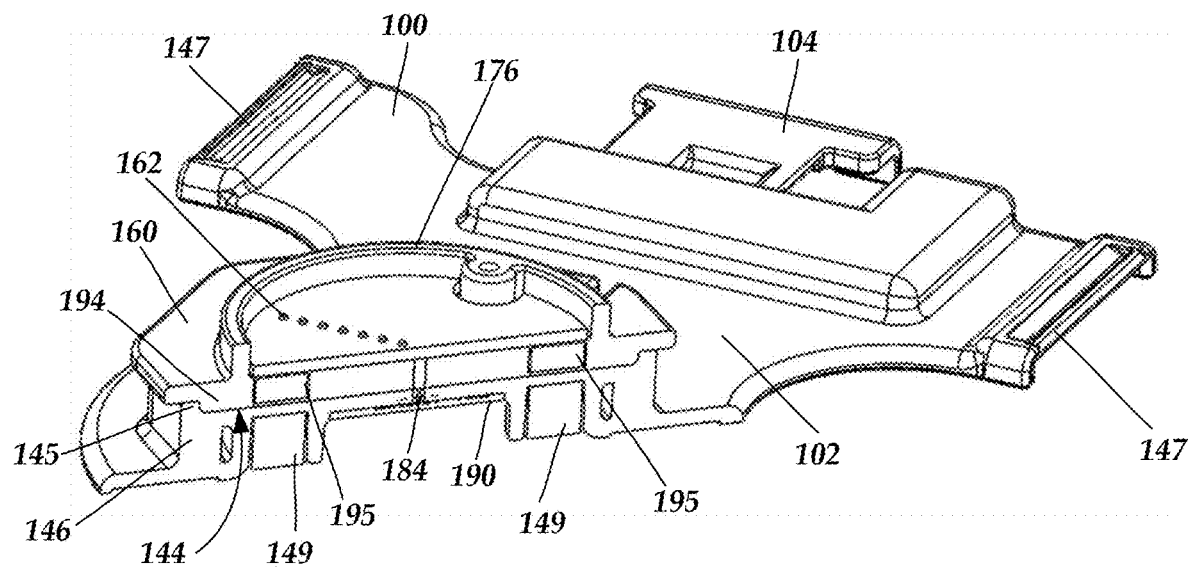
FIG. 11F is a schematic perspective partial cross-sectional back view of the docking adapter of FIG. 9A and a portion the dock of FIG. 11C, according to the invention.
Figure 11G:
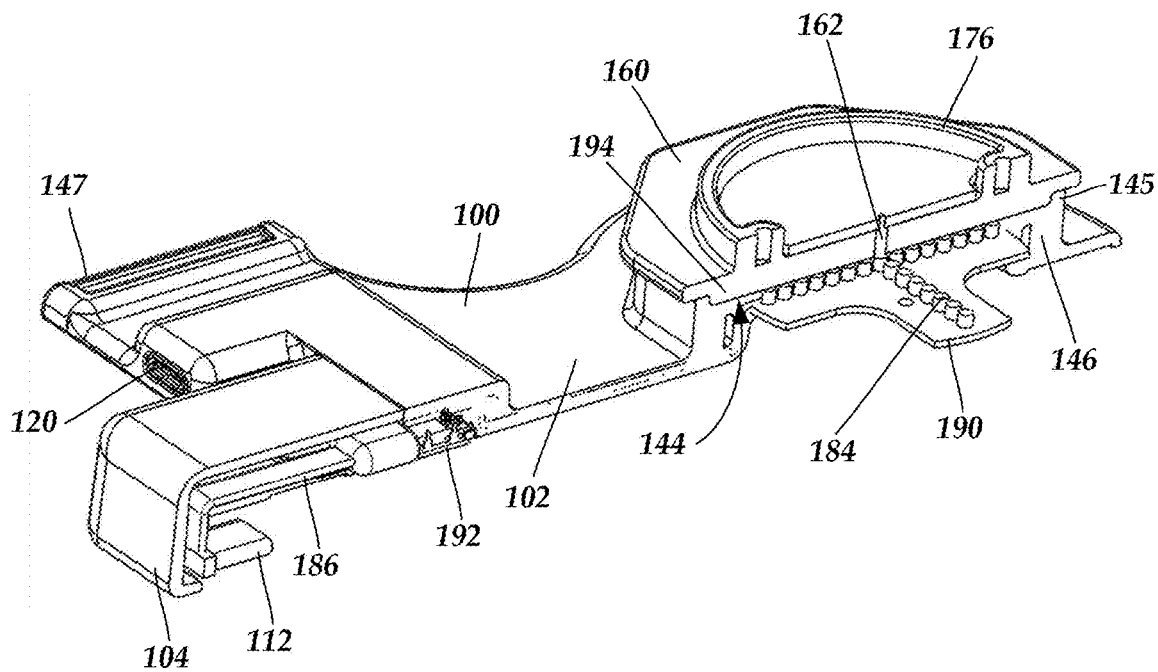
FIG. 11G is a schematic perspective cross-sectional back view of the docking adapter of FIG. 9A and a portion the dock of FIG. 11C from a different angle, according to the invention.

As another example of a coupling arrangement, in at least some embodiments, a docking adapter 106 and a dock 160 or other external device are coupled together using magnets. FIG. 11F illustrates the coupling of the docking indentation 144 of the docking adapter 106 to the docking button 194 of the dock 160 or other external device using one or more magnets 149 in the docking adapter and one or more magnets 195 (or any combination thereof) in the dock or other external device. In at least some embodiments, one or more of the magnets 149 or the magnets 195 are individually replaced with a magnetically-attracted piece, such as an iron, steel, nickel, or cobalt piece or the like, so that there is at least one complementary magnet/magnetically-attracted-piece pair when the docking adapter is coupled to the dock or other external device. In at least some embodiments, the magnets 149, 195 (and magnetically-attracted pieces) are fully or partially embedded in the material of the docking adapter 106 or dock 160 or other external device. It will be understood that the use of magnets 149, 195 (and, optionally, magnetically-attracted pieces) can be used in any of the docking adapters 106 and docks 160 or other external devices described above.

The docking adapter 106 of FIGS. 11A to 11G illustrate another arrangement of the female connector 120, male plug 112, and intermediate connector structure 192. In this embodiment, the female connector 120 is oriented so that the opening is oriented in the same direction as the female connector in the mobile device 150 that receives the male plug 112. In contrast, the docking adapter 106 of FIGS. 9A to 10C includes a female connector 120 with an opening that is oriented perpendicular (or non-parallel) to the opening of the female connector in the mobile device 150 that receives the male plug 112.

In at least some embodiments, the docking adapter 106 of FIGS. 11A to 11G includes one or more strap connectors 147 for attachment of a strap 148 (e.g., a hand strap), as illustrated in FIG. 11E. In at least some embodiments, the strap 148 is permanently attached to the docking adapter 106. In other embodiments, the strap 148 is removably attached to the docking adapter 106. Any suitable strap 148 can be used and the strap can be made using any suitable material, such as, but not limited to, fabric, polymer, metal, leather, or the like or any combination thereof. It will be understood that strap connectors 147 and a strap 148 can be added to any of the other embodiments described herein. The strap 148 and strap connectors 147 can be oriented in any suitable direction relative to the mobile device 150.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A docking adapter for a mobile device, the docking adapter comprising:
   an adapter body comprising a back plate and a connector body coupled to the back plate, the back plate configured for disposition against a portion of a back surface of the mobile device or of a case containing the mobile device, wherein, when coupled to the mobile device, the docking adapter only engages the back surface and a single side surface of the mobile device or the case containing the mobile device;
   a connector adapter at least partially disposed in the connector body, the connector adapter comprising a male plug configured for insertion into a female connector of the mobile device, the male plug comprising a plurality of first contacts configured for electrically coupling to the mobile device;
   a plurality of second contacts electrically coupled to the first contacts and configured for electrically coupling to a dock or other external device; and
   either a) a docking button permanently coupled to, and extending away from, the back plate of the adapter body or b) a docking button indentation defined in, or attached to, the back plate of the adapter body and configured to receive a docking button.

2. The docking adapter of claim 1, wherein the connector adapter further comprises a contactor disposed opposite the male plug and exposed through an opening in the connector body, wherein the second contacts are disposed on the contactor.

3. The docking adapter of claim 1, further comprising third contacts configured for engagement with contacts on a back surface of the mobile device or the case.

4. The docking adapter of claim 1, wherein at least a portion of the second contacts are disposed on the docking button or the docking button indentation.

5. The docking adapter of claim 4, wherein the connector adapter further comprises a contactor disposed opposite the male plug and exposed through an opening in the connector body, wherein another portion of the second contacts are disposed on the contactor.

6. The docking adapter of claim 1, wherein the docking button has a shape selected from triangular, square, rectangular, rhomboidal, trapezoidal, pentagonal, hexagonal, octagonal, or decagonal.

7. The docking adapter of claim 1, further comprising a strap coupled to the adapter body for receiving a hand of a user.

8. The docking adapter of claim 1, wherein the connector adapter further comprises a female connector electrically coupled to the male plug.

9. The docking adapter of claim 8, wherein the female connector is positioned to be adjacent a back surface of the mobile device or the case when the mobile device is coupled to the docking adapter.

10. The docking adapter of claim 1, wherein the adapter body comprises a rim extending around a least a portion of the back plate.

11. The docking adapter of claim 1, further comprising adhesive disposed on at least the back plate.

12. The docking adapter of claim 11, wherein the adapter body and adhesive are configured to produce a water-resistant seal around the docking adapter when the docking adapter is adhesively attached to the mobile device or case.

13. A system, comprising:
   the docking adapter of claim 1; and
   a dock configured for receiving the docking button of the docking adapter.

14. The system of claim 13, further comprising the mobile device.

15. The system of claim 14, further comprising a case configured to contain the mobile device.

16. A docking adapter for a mobile device, the docking adapter comprising:
   an adapter body comprising a back plate and a connector body coupled to the back plate, the back plate configured for disposition against a portion of a back surface of the mobile device or of a case containing the mobile device;
   a connector adapter at least partially disposed in the connector body, the connector adapter comprising a male plug configured for insertion into a female connector of the mobile device and comprising a plurality of first contacts configured for electrically coupling to the mobile device and a plurality of second contacts electrically coupled to the first contacts and configured for electrically coupling to a dock or other external device; and
   either a) a docking button permanently coupled to, and extending away from, the back plate of the adapter body or b) a docking button indentation defined in, or attached to, the back plate of the adapter body and configured to receive a docking button.

17. The docking adapter of claim 16, further comprising a plurality of docking button contacts disposed on the docking button or the docking button indentation and electrically coupled to the first contacts.

18. A docking adapter for a mobile device, the docking adapter comprising:
   an adapter body comprising a back plate and a connector body coupled to the back plate, the back plate configured for disposition against a portion of a back surface of the mobile device or of a case containing the mobile device, wherein, when coupled to the mobile device, the docking adapter only engages the back surface and a single side surface of the mobile device or the case containing the mobile device;

a connector adapter at least partially disposed in the connector body, the connector adapter comprising a male plug configured for insertion into a female connector of the mobile device and comprising a plurality of first contacts configured for electrically coupling to the mobile device; and either a) a docking button permanently coupled to, and extending away from, the back plate of the adapter body or b) a docking button indentation defined in, or attached to, the back plate of the adapter body and configured to receive a docking button, wherein the docking button or docking button indentation comprises a plurality of second contacts electrically coupled to the first contacts and configured for electrically coupling to a dock or other external device.

19. A system, comprising:

the docking adapter of claim 18; and a dock configured for receiving the docking button of the docking adapter.

20. The system of claim 19, further comprising the mobile device and the case configured to contain the mobile device.

\* \* \* \* \*